(12) United States Patent
Shinagawa et al.

(10) Patent No.: US 10,563,623 B2
(45) Date of Patent: Feb. 18, 2020

(54) EXHAUST GAS RECIRCULATION COOLER

(71) Applicant: TOYOTA JIDOSHA KABUSHIKI KAISHA, Toyota-shi, Aichi-ken (JP)

(72) Inventors: Tomohiro Shinagawa, Sunto-gun (JP); Takashi Hotta, Susono (JP); Takeo Yamaguchi, Susono (JP); Yoshio Ohashi, Susono (JP); Taizo Yoshinaga, Susono (JP); Yuji Miyoshi, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/160,280

(22) Filed: Oct. 15, 2018

(65) Prior Publication Data

US 2019/0186430 A1 Jun. 20, 2019

(30) Foreign Application Priority Data

Dec. 14, 2017 (JP) .................................. 2017-239667

(51) Int. Cl.
*F02M 26/28* (2016.01)
*F02M 26/32* (2016.01)
*F02M 26/37* (2016.01)
*F02M 26/33* (2016.01)

(52) U.S. Cl.
CPC ............ *F02M 26/28* (2016.02); *F02M 26/32* (2016.02); *F02M 26/33* (2016.02); *F02M 26/37* (2016.02)

(58) Field of Classification Search
CPC ........ F02M 26/28; F02M 26/32; F02M 26/37; F02M 26/33; F02M 26/30; F02M 26/35; F02M 26/11; F02M 26/50; F02M 26/25; F02M 35/10268; F02M 35/10157; F28D 21/0003; F28D 20/003; F02D 41/26; F02D 41/0077
See application file for complete search history.

(56) References Cited

U.S. PATENT DOCUMENTS

| 7,971,577 | B2* | 7/2011 | Styles ..................... F02M 26/50 123/568.12 |
| 2011/0048388 | A1 | 3/2011 | Takahashi et al. |
| 2017/0298874 | A1* | 10/2017 | Kuske .................... F02M 26/24 |
| 2017/0335805 | A1* | 11/2017 | Zhang ........................ F01P 3/20 |

(Continued)

FOREIGN PATENT DOCUMENTS

| DE | 10 2017 111 122 A1 | 11/2017 |
| EP | 2 293 002 A2 | 3/2011 |

(Continued)

*Primary Examiner* — George C Jin
(74) *Attorney, Agent, or Firm* — Finnegan, Henderson, Farabow, Garrett & Dunner, LLP

(57) ABSTRACT

An EGR cooler in the disclosure includes: a gas path configured to allow an EGR gas to flow; a refrigerant path configured to perform heat exchange between the EGR gas circulating along the gas path and a refrigerant; an exothermic body containing portion configured such that an exothermic body to generate heat by adsorbing a predetermined working gas is contained within the EGR cooler and at least a part of the exothermic body contacts with a wall surface of the gas path; a working gas tank in which the working gas is stored; and a gas moving apparatus configured to move the working gas stored in the working gas tank, from the working gas tank to the exothermic body containing portion.

10 Claims, 8 Drawing Sheets

(56) References Cited

U.S. PATENT DOCUMENTS

2018/0094610 A1* 4/2018 Quix .................. F02M 26/04
2018/0372422 A1 12/2018 Noguchi et al.

FOREIGN PATENT DOCUMENTS

| JP | 2006-125215 | | 5/2006 |
|----|-------------|---|--------|
| JP | 2011-052919 | | 3/2011 |
| JP | 2014-039900 | A | 3/2014 |
| JP | 2017-120075 | A | 7/2017 |
| JP | 2017-129080 | A | 7/2017 |

* cited by examiner

EXHAUST GAS RECIRCULATION COOLER

INCORPORATION BY REFERENCE

The disclosure of Japanese Patent Application No. 2017-239667 filed on Dec. 14, 2017 including the specification, drawings and abstract is incorporated herein by reference in its entirety.

BACKGROUND

1. Technical Field

The disclosure relates to an exhaust gas recirculation cooler that performs heat exchange between an exhaust gas recirculation gas and a refrigerant in an internal combustion engine.

2. Description of Related Art

In recent years, as an exhaust gas recirculation (EGR) apparatus for recirculating some of exhaust gas discharged from an internal combustion engine, to an intake system, there is known an exhaust gas recirculation apparatus in which an EGR cooler for the heat exchange between an EGR gas and a refrigerant is disposed in the middle of an EGR passage. In the EGR apparatus including the EGR cooler, if the EGR gas flows into the EGR cooler when the atmosphere temperature in the EGR cooler is low, for example, immediately after a cold start of the internal combustion engine, a condensed water can be generated by the condensation of moisture in the EGR gas at the time of the contact between a wall surface of a passage in the EGR cooler and the EGR gas. The condensed water generated in this way contains acidic substances such as sulfuric acid ($H_2SO_4$), sulfuric anhydride ($SO_3$) or nitric acid ($NHO_3$), and therefore, can cause disadvantages such as the corrosion of components on the EGR gas path. In response to this problem, there can be a method in which a heat storage material is disposed on the EGR passage on the upstream side of the EGR cooler and the EGR gas flowing into the EGR cooler is warmed by the heat stored in the heat storage material (for example, see Japanese Patent Application Publication No. 2006-125215).

SUMMARY

In the method described in Japanese Patent Application Publication No. 2006-125215, the heat stored in the heat storage material is transferred to the EGR cooler through the EGR gas. Therefore, some of the heat transferred from the heat storage material to the EGR gas can be carried by the EGR gas without being transferred to the EGR cooler, or can be released from the EGR gas before being transferred to the EGR cooler. That is, the ratio of the heat to be transferred to the EGR cooler to the heat transferred from the heat storage material to the EGR cooler is prone to be low. Therefore, there is a concern that it is difficult to efficiently warm the EGR cooler. Further, immediately after the EGR gas warmed by the heat storage material starts to flow in the EGR cooler, the wall surface of the passage in the EGR cooler is cold. Accordingly, there is a possibility that it is impossible to restrain the generation of the condensed water at the time of the contact between the wall surface of the passage and the EGR gas. In response, there can be a method in which the heat storage material is provided in the EGR cooler as described in Japanese Patent Application Publication No. 2011-052919. The heat storage material herein adsorbs the heat in the EGR cooler when the temperature in the EGR cooler is higher than the temperature of the heat storage material, and releases the heat stored in the heat storage material when the temperature in the EGR cooler is lower than the temperature of the heat storage material. However, in the method described in Japanese Patent Application Publication No. 2011-052919, when the temperature in the EGR cooler becomes lower than the temperature of the heat storage material during the stop of the operation of the internal combustion engine, the heat stored in the heat storage material is automatically released. Therefore, there is a concern that it is difficult to effectively warm the EGR cooler when it is necessary to warm the EGR cooler.

The disclosure has been made in view of various circumstances described above, and an object of the disclosure is to provide a technology allowing the EGR cooler to be warmed efficiently and effectively.

The disclosure provides an EGR cooler in which an exothermic body to generate heat by adsorbing a predetermined working gas is disposed such that the exothermic body can exchange heat with a wall surface of a gas path in the EGR cooler. The EGR cooler includes a mechanism for supplying the working gas to the exothermic body.

An aspect of the present disclosure relates to an exhaust gas recirculation cooler which is disposed in a middle of an exhaust gas recirculation passage, the exhaust gas recirculation passage connecting an exhaust passage and an intake passage of an internal combustion engine, the exhaust gas recirculation cooler configured to perform heat exchange between an exhaust gas recirculation gas and a refrigerant, the exhaust gas recirculation gas being a gas which flows along the exhaust gas recirculation passage, the exhaust gas recirculation cooler including: a gas path which is a passage formed within the exhaust gas recirculation cooler, the gas path configured such that the exhaust gas recirculation gas flows along the gas path; a refrigerant path which is a passage along which the refrigerant circulates within the exhaust gas recirculation cooler, the refrigerant path configured to perform the heat exchange between the exhaust gas recirculation gas circulating along the gas path and the refrigerant; an exothermic body containing portion in which an exothermic body is contained within the exhaust gas recirculation cooler, the exothermic body generating heat by adsorbing a prescribed working gas, the exothermic body containing portion being configured such that at least a part of the exothermic body contacts with a wall surface of the gas path; a working gas tank in which the working gas is stored; and a gas moving apparatus being configured such that the working gas stored in the working gas tank moves from the working gas tank to the exothermic body containing portion.

In the EGR cooler configured as described above, when the working gas stored in the working gas tank is moved from the working gas tank to the exothermic body containing portion by the gas moving apparatus, the working gas is adsorbed by the exothermic body of the exothermic body containing portion. When the working gas is adsorbed by the exothermic body, the exothermic body generates heat. The heat generated due to the adsorption of the working gas by the exothermic body is directly transferred from the exothermic body to the wall surface of the gas path. Therefore, the ratio of the heat transferred to the wall surface of the gas path to the heat generated by the exothermic body is prone to be high. As a result, it is possible to efficiently warm the wall surface of the gas path in the EGR cooler. Further, with the EGR cooler configured as described above, when it is necessary to warm the wall surface of the gas path in the EGR cooler, the gas moving apparatus can move the working gas from the working gas tank to the exothermic body containing portion. Thereby, it is also possible to effectively warm the wall surface of the gas path in the EGR cooler.

Here, the exothermic body according to the disclosure may be an exothermic body that generates heat due to the latent heat associated with the phase change (the phase change from the gas phase to the liquid phase) of the working gas when the working gas is physically adsorbed by the exothermic body, or may be an exothermic body that generates heat due to the reaction heat generated when the working gas is chemically adsorbed by the exothermic body.

In the above aspect, the working gas adsorbed in the exothermic body may be desorbed when a temperature of the exothermic body is equal to or higher than a predetermined desorption temperature. The gas moving apparatus may be configured such that, after the amount of the working gas which is contained in the working gas stored in the working gas tank moves from the working gas tank to the exothermic body containing portion becomes equal to or larger than a predetermined amount, the working gas desorbed from the exothermic body moves from the exothermic body containing portion to the working gas tank when the temperature of the exothermic body is equal to or higher than the desorption temperature.

The "predetermined amount" herein does not need to be the whole amount of the working gas stored in the working gas tank, and for example, may be an amount that makes it possible to raise the temperature of the wall surface of the gas path in the EGR cooler, to a temperature at which the generation of the condensed water can be restrained.

In the EGR cooler configured as described above, when the temperature of the wall surface of the gas path and the temperature of the exothermic body are low, for example, immediately after a cold start of the internal combustion engine, the working gas stored in the working gas tank is moved from the working gas tank to the exothermic body containing portion, and thereby, it is possible to efficiently warm the wall surface of the gas path. Thereafter, when the EGR gas flows along the gas path of the EGR cooler, the EGR gas comes into contact with the wall surface of the gas path. However, the wall surface of the gas path has been already warmed by the heat generated by the exothermic body, and therefore, the generation of the condensed water is restrained. Then, when the operation of the internal combustion engine is continued and thereby the temperature of the EGR gas rises to some extent, the heat of the EGR gas is transferred to the exothermic body through the wall surface of the gas path, and therefore, the temperature of the exothermic body further rises. Then, when the temperature of the exothermic body rises to equal to or higher than the desorption temperature, the working gas adsorbed in the exothermic body is desorbed from the exothermic body. Here, if the working gas desorbed from the exothermic body stays in the exothermic body containing portion, when the temperature of the exothermic body decreases to lower than the desorption temperature during, for example, the subsequent stop of the operation of the internal combustion engine, the working gas is adsorbed by the exothermic body again, so that the exothermic body unnecessarily generates heat. If the working gas desorbed from the exothermic body is moved from the exothermic body containing portion to the working gas tank by the gas moving apparatus when the temperature of the exothermic body is equal to or higher than the desorption temperature after the working gas stored in the working gas tank is moved from the working gas tank to the exothermic body containing portion, it is possible to restrain the exothermic body from unnecessarily generating heat. Furthermore, in the case of collecting the working gas in the working gas tank by moving the working gas desorbed from the exothermic body from the exothermic body containing portion to the working gas tank when the temperature of the exothermic body is equal to or higher than the desorption temperature, it is possible to make the exothermic body adsorb a predetermined amount or more of the working gas, by moving the working gas collected in the working gas tank from the working gas tank to the exothermic body containing portion again, when it is necessary to warm the wall surface of the gas path at the time of the next operation of the internal combustion engine, for example. Accordingly, it is possible to warm the wall surface of the gas path efficiently and effectively.

In the above aspect, the working gas tank may be disposed outside the exhaust gas recirculation cooler. The gas moving apparatus may include: a communication passage which connects the exothermic body containing portion and the working gas tank; a switching valve which is provided in a middle of the communication passage, the switching valve switching the communication passage between a conducted state and a blocked state; and a control unit which controls the switching valve. The control unit may move the working gas stored in the working gas tank from the working gas tank to the exothermic body containing portion by controlling the switching valve so as to conduct the communication passage, when a pressure of the working gas tank is higher than a pressure of the exothermic body containing portion.

In the above aspect, a path for the working gas which includes the exothermic body containing portion, the working gas tank and the communication passage may be filled with only an amount of the working gas, the amount being a containable amount of the working gas tank.

For example, in the production process for the EGR cooler, the working gas may be filled into the working gas tank, after the switching valve is closed while the working gas path including the exothermic body containing portion, the communication passage and the working gas tank is in a vacuum state.

Here, when the temperature of the wall surface of the gas path in the EGR cooler is a temperature allowing the condensed water to be generated, for example, immediately after the cold start of the internal combustion engine, it is expected that the temperature in the exothermic body containing portion of the EGR cooler and the temperature in the working gas tank are nearly equivalent to each other. In such a case, when the communication passage is blocked by the switching valve in a state where the working gas is stored in the working gas tank, the pressure in the working gas tank becomes nearly the saturation vapor pressure of the working gas, and the pressure in the exothermic body containing portion becomes nearly the vacuum pressure. As a result, the pressure in the working gas tank becomes higher than the pressure in the exothermic body containing portion of the EGR cooler. Thus, if the control unit controls the switching valve so as to conduct the communication passage when the pressure in the working gas tank is higher than the pressure in the exothermic body containing portion, the working gas stored in the working gas tank inevitably moves from the working gas tank to the exothermic body containing portion.

In the above aspect, after the control unit controls the switching valve so as to conduct the communication passage such that the working gas stored in the working gas tank moves from the working gas tank to the exothermic body containing portion, the control unit may move the working gas desorbed from the exothermic body, from the exothermic body containing portion to the working gas tank, by controlling the switching valve so as to continue to conduct the communication passage until a predetermined timing. The predetermined timing may be a timing after the temperature of the exothermic body rises to the desorption temperature.

When the EGR gas flows along the gas path in the EGR cooler with the continuation of the operation of the internal combustion engine after the working gas stored in the working gas tank moves from the working gas tank to the exothermic body containing portion as described above, the temperature in the EGR cooler (the temperature in the exothermic body containing portion) rises, so that the exothermic body rises to a temperature equal to or higher than the desorption temperature. Thereby, the working gas adsorbed in the exothermic body is desorbed from the exothermic body. Then, the amount of the working gas in the exothermic body containing portion becomes more than the amount of the working gas in the working gas tank, so that the pressure in the exothermic body containing portion becomes more than the pressure in the working gas tank. Therefore, when the communication passage continues to be in the conducted state by the switching valve until the predetermined timing after the working gas stored in the working gas tank moves from the working gas tank to the exothermic body containing portion, the working gas desorbed from the exothermic body inevitably moves from the exothermic body containing portion to the working gas tank. Then, at the predetermined timing, the communication passage is blocked by the switching valve, and thereby, the working gas moved from the exothermic body containing portion to the working gas tank can be stored in the working gas tank. The "predetermined timing" herein is an estimated timing when the working gas adsorbed in the exothermic body is completely desorbed from the exothermic body and the working gas desorbed from the exothermic body is completely moved from the exothermic body containing portion to the working gas tank. Here, the state where "the working gas adsorbed in the exothermic body is completely desorbed from the exothermic body" is not limited to a state where the whole amount of the working gas adsorbed in the exothermic body is desorbed from the exothermic body, and may correspond to a state where the predetermined amount or more of working gas contained in the working gas adsorbed in the exothermic body is desorbed from the exothermic body. Similarly, the state where "the working gas desorbed from the exothermic body is completely moved from the exothermic body containing portion to the working gas tank" is not limited to a state where the whole amount of the working gas desorbed from the exothermic body is moved from the exothermic body containing portion to the working gas tank, and may correspond to a state where the predetermined amount or more of working gas contained in the working gas desorbed from the exothermic body is moved from the exothermic body containing portion to the working gas tank. In short, it is only necessary that an amount of the working gas, which allows the exothermic body to adsorb the predetermined amount or more of the working gas when the communication passage is switched from the blocked state to the conducted state by the switching valve immediately after the next cold start of the internal combustion engine, is desorbed from the exothermic body and is returned to the working gas tank, for example.

In the above aspect, the communication passage may be connected to the exothermic body containing portion, such that the working gas flows along a direction intersecting a flow direction of the exhaust gas recirculation gas and flows toward a plurality of spots of the exothermic body in the exothermic body containing portion, when the working gas flows into the exothermic body containing portion.

For effectively cooling the EGR gas with the EGR cooler, the length of the EGR cooler in the flow direction of the EGR gas needs to be relatively longer, in the comparison between the length in the flow direction of the EGR gas and the length in the direction orthogonal to the flow direction of the EGR gas. Consequently, the length of the exothermic body is also longer in the flow direction of the EGR gas than in the direction orthogonal to the flow direction of the EGR gas. As the length of the exothermic body in the circulation direction of the working gas is longer, it is harder for the working gas to run through the whole of the exothermic body. Particularly, in the above-described configuration in which the working gas is moved using the pressure difference between the pressure in the working gas tank and the pressure in the exothermic body containing portion, when the length of the exothermic body in the circulation direction of the working gas is long, it is hard for the working gas to run through the whole of the exothermic body. Regarding this problem, the communication passage is connected to the exothermic body containing portion such that the working gas flows into the exothermic body containing portion along the direction crossing the flow direction of the EGR gas and flows into the exothermic body containing portion toward the plurality of spots of the exothermic body. Thereby, it is easy for the working gas to run through the whole of the exothermic body after the working gas flows into the exothermic body containing portion. As a result, heat can be generated from nearly the whole of the exothermic body contained in the exothermic body containing portion.

In the above aspect, the control unit may move the working gas stored in the working gas tank, from the working gas tank to the exothermic body containing portion, by controlling the switching valve so as to conduct the communication passage, when a temperature of the internal combustion engine at a start of the internal combustion engine is lower than a predetermined threshold.

The "predetermined threshold" herein is an temperature of the internal combustion engine being a temperature below which the temperature of the wall surface of the gas path is estimated to become a temperature allowing the condensed water to be generated and the temperature of the exothermic body becomes lower than the desorption temperature. As described above, when the temperature of the wall surface of the gas path is in a temperature range allowing the condensed water to be generated, for example, immediately after the cold start of the internal combustion engine (that is, when the temperature of the internal combustion engine at the start of the internal combustion engine is lower than the threshold), it is expected that the temperatures of the EGR cooler and the working gas tank have decreased to a temperature nearly equivalent to the outside air temperature. In such a state, when the working gas is stored in the working gas tank and the communication passage is blocked by the switching valve, it is expected that the pressure in the working gas tank is higher than the pressure in the exothermic body containing portion of the EGR cooler. Therefore, when the temperature of the internal combustion engine at the start of the internal combustion engine is lower than the threshold, the control unit controls the switching valve so as to conduct the communication passage, and thereby, the working gas stored in the working gas tank inevitably moves from the working gas tank to the exothermic body containing portion. Thereby, it is possible to warm the wall surface of the gas path of the EGR cooler efficiently and effectively, and therefore, it is possible to restrain the generation of the condensed water more surely.

In the above aspect, the exhaust gas recirculation cooler may further include a circulation control unit which allows the exhaust gas recirculation gas to flow along the gas path when a predetermined circulation condition is satisfied. The circulation condition may include a condition in which a time elapsing after the control unit controls the switching valve so as to conduct the communication passage when the temperature of the internal combustion engine at the start of the internal combustion engine is lower than the threshold is equal to or longer than a predetermined temperature rise time.

The "predetermined temperature rise time" herein is a time required after the working gas starts to move from the working gas tank to the exothermic body containing portion by the control of the switching valve for conducting the communication passage and before the temperature of the wall surface of the gas path rises to a temperature which does not allow the condensed water to be generated. With this configuration, the EGR gas is restrained from circulating along the gas path when the temperature of the wall surface of the gas path is a temperature allowing the condensed water to be generated, and therefore, it is possible to restrain the generation of the condensed water more surely.

In the above aspect, at least a part of the exothermic body containing portion may be disposed so as to be adjacent to the refrigerant path.

With this configuration, even when a relatively large amount of heat is transferred from the EGR gas to the exothermic body through the wall surface of the gas path during the operation of the internal combustion engine due to a relatively high temperature of the EGR gas that flows into the EGR cooler, it is possible to restrain the overheating of the exothermic body, because the heat of the exothermic body is removed by the refrigerant that circulates along the refrigerant path.

In the above aspect, the working gas may be a gas which has a molecular size equivalent to or smaller than a molecular size of water or ammonia. The exothermic body may be formed of a porous material which has a plurality of pores having a larger pore size than the molecular size of the working gas.

This configuration is based on the inventors' knowledge that the use of the working gas and the exothermic body allows the exothermic body to adsorb the working gas more surely and allows the exothermic body to effectively generate heat.

With the disclosure, it is possible to warm the EGR cooler efficiently and effectively.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, specific embodiments of the disclosure will be described based on the drawings. Sizes, materials, shapes, relative arrangements and the like of constituent components described in the embodiments are not intended to limit the technical scope of the disclosure to only them, unless otherwise mentioned.

First Embodiment

Figure 1:
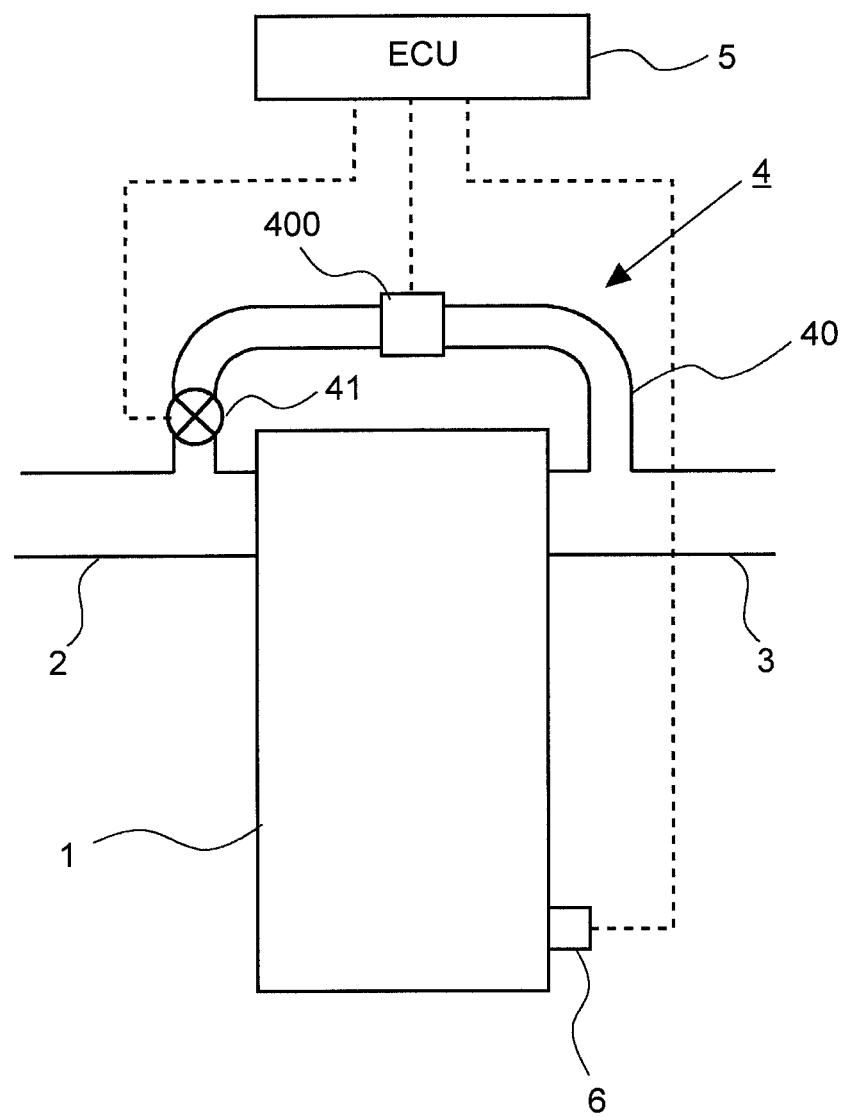
FIG. 1 is a diagram showing a schematic configuration of an internal combustion engine to which the EGR cooler of the disclosure is applied.

First, a first embodiment of the disclosure will be described based on FIG. 1 to FIG. 8. FIG. 1 is a diagram showing a schematic configuration of an internal combustion engine to which the EGR cooler of the disclosure is applied. An internal combustion engine 1 shown in FIG. 1 is a spark-ignition internal combustion engine that uses gasoline as fuel or a compression-ignition internal combustion engine that uses diesel fuel as fuel. To the internal combustion engine 1, an intake passage 2 and an exhaust passage 3 are connected. The intake passage 2 is a passage through which fresh air (air) taken from the ambient atmosphere is led into an unillustrated cylinder of the internal combustion engine 1. The exhaust passage 3 is a passage through which gas combusted in the cylinder of the internal combustion engine 1 flows via an unillustrated exhaust gas control catalyst and the like.

The internal combustion engine 1 is provided with an EGR apparatus 4. The EGR apparatus 4 includes an EGR passage 40 as a passage that branches from the middle of the exhaust passage 3 and merges into the middle of the intake passage 2 and through which some of an exhaust gas flowing through the exhaust passage 3 is led to the intake passage 2 as an EGR gas, and an EGR valve 41 as a valve apparatus that is provided in the middle of the EGR passage 40 and that changes the passage sectional area of the EGR passage 40. In a configuration in which the internal combustion engine 1 includes an unillustrated exhaust gas turbine turbocharger (turbocharger), the EGR passage 40 may be configured such that the EGR gas is led from the exhaust passage 3 on the upstream side of a turbine to the intake passage 2 on the downstream side of a compressor, or may be configured such that the EGR gas is led from the exhaust passage 3 on the downstream side of the turbine to the intake passage 2 on the upstream side of the compressor.

In the EGR apparatus 4, when the EGR valve 41 is opened, some (EGR gas) of the exhaust gas flowing through the exhaust passage 3 is led to the intake passage 2 through the EGR passage 40. The EGR gas led to the intake passage 2 is taken in the cylinder of the internal combustion engine 1, together with the fresh air flowing through the intake passage 2, and is used for combustion. On that occasion, the combustion temperature of an air-fuel mixture decreases, for example, due to the action of an inert gas component contained in the EGR gas. Therefore, it is possible to reduce the generation amount of NOx.

Since the EGR gas is some of the gas combusted in the cylinder of the internal combustion engine 1, the temperature of the EGR gas is higher than the temperature of the fresh air. Therefore, when the EGR gas is mixed in the fresh air, the temperature of the fresh air rises, so that the volume of the fresh air expands. As a result, the mass of the fresh air to be filled into the cylinder of the internal combustion engine 1 decreases, and therefore, there is a possibility of the decrease in filling efficiency. Hence, the EGR apparatus 4 in the embodiment is provided with an EGR cooler 400 for cooling the EGR gas.

Configuration of EGR Cooler

Figure 2:
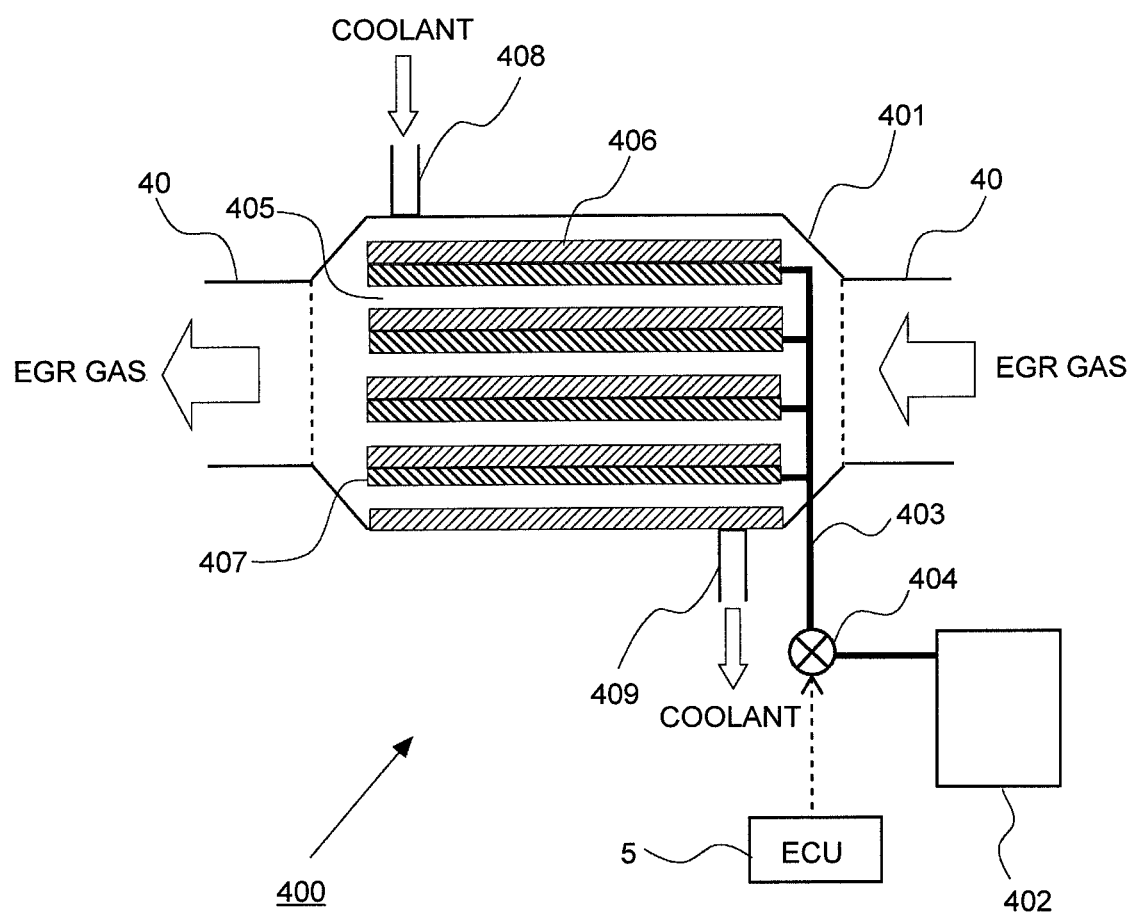
FIG. 2 is a diagram showing a configuration of an EGR cooler in a first embodiment.

Here, a configuration of the EGR cooler 400 in the embodiment will be described based on FIG. 2. The EGR cooler 400 includes an EGR cooler body 401 that is disposed in the middle of the EGR passage 40. Within the EGR cooler body 401, a plurality of gas paths 405, a plurality of refrigerant paths 406 and a plurality of exothermic body containing portions 407 are formed. The gas path 405 is a path that communicates with the EGR passage 40 and is a path along which the EGR gas flows. The refrigerant path 406 is a path along which a refrigerant circulates, and the refrigerant exchanges heat with the EGR gas that flows along the gas path 405. In the example shown in FIG. 2, as the refrigerant that circulates along the refrigerant path 406, a coolant is used, but a liquid or gas other than the coolant may be used. The exothermic body containing portion 407 is a space in which an exothermic body described later is contained. The exothermic body containing portion 407 is adjacent to the gas path 405 across a partition wall forming the gas path 405, and further, is adjacent to the refrigerant path 406 across a partition wall forming the refrigerant path 406. On that occasion, the exothermic body contained in the exothermic body containing portion 407 is disposed so as to contact with the partition wall between the gas path 405 and the exothermic body containing portion 407 (that is, the partition wall forming the gas path 405), and further, contact with the partition wall between the refrigerant path 406 and the exothermic body containing portion 407 (that is, the partition wall forming the refrigerant path 406). Note that, regarding the partition wall forming the gas path 405 and the partition wall forming the refrigerant path 406, the exothermic body contained in the exothermic body containing portion 407 actually only needs to contact with at least the partition wall forming the gas path 405. Further, the gas path 405 and the refrigerant path 406 are adjacent to each other across the partition walls forming these paths, such that heat is directly exchanged between the EGR gas circulating along the gas path 405 and the coolant circulating along the refrigerant path 406. Furthermore, the EGR cooler body 401 is provided with an inlet 408 through which the coolant flows in the refrigerant path 406 and an outlet 409 through which the coolant passing through the refrigerant path 406 flows out. Although not illustrated in FIG. 2, the coolant flowing out of the outlet 409 is cooled by a heat exchanger such as a radiator, and then flows in the inlet 408 again.

In the EGR cooler 400 configured described above, when the EGR gas flows from the EGR passage 40 into the gas path 405 of the EGR cooler body 401, heat is exchanged between the EGR gas and the coolant circulating along the refrigerant path 406, so that the temperature of the EGR gas is decreased. When the temperature of the EGR gas is decreased in this way, the temperature rise of the fresh air when the EGR gas is introduced into the intake passage 2 is reduced, and therefore, it is possible to restrain the decrease in filling efficiency described above.

When the EGR cooler body 401 is in a cold state, for example, immediately after a cold start of the internal combustion engine 1, the temperature of the wall surface forming the gas path 405 (hereinafter, sometimes referred to as merely the "wall surface of the gas path 405") can become a dew point or lower. The "dew point" herein is a temperature at which the moisture contained in the EGR gas starts to condense, and is referred to as the "dew point of the EGR gas", hereinafter. If the EGR gas flows into the gas path 405 of the EGR cooler body 401 when the temperature of the wall surface of the gas path 405 is equal to or lower than the dew point, a condensed water can be generated by the condensation of the moisture contained in the EGR gas at the time of the contact between the EGR gas and the wall surface of the gas path 405. The condensed water generated in this way contains acidic substances such as sulfuric acid ($H_2SO_4$), sulfuric anhydride ($SO_3$) or nitric acid ($NHO_3$), and therefore, can cause disadvantages such as the corrosion of components (for example, components of an intake system such as the EGR cooler body 401 and an intercooler) disposed on the EGR gas path. Therefore, it is demanded to restrain the generation of the condensed water in the EGR cooler body 401 as much as possible.

In response to the above demand, there can be a method of indirectly warming the EGR cooler body by providing a heat source for warming the EGR gas at a stage before the EGR gas flows into the EGR cooler body and warming the EGR gas with the heat source at the time of the cold state of the EGR cooler body. However, some of the heat transferred from the heat source to the EGR gas can be carried by the EGR gas without being transferred to the EGR cooler body, or can be released from the EGR gas before the EGR gas flows into the EGR cooler body. Therefore, the ratio of the heat transferred from the EGR gas to the EGR cooler body to the heat transferred from the heat source to the EGR gas is prone to be low, and there is a possibility that it is difficult to efficiently warm the EGR cooler body. Further, in this method, the condensed water can be generated in a period before the temperature of the wall surface of the gas path exceeds the dew point of the EGR gas. As another method, there can be a method of incorporating a heat storage material in the EGR cooler body and storing, in the heat storage material, the heat of the EGR gas at the time of the warm state of the EGR cooler body. However, the heat stored in the heat storage material is released from the heat storage material by itself, when the temperature of the EGR cooler body becomes lower than the temperature of the heat storage material during the stop of the operation of the internal combustion engine. Therefore, there is a concern that the amount of the heat to be released from the heat storage material is small when the EGR cooler body needs to be warmed (for example, when the condensed water can be generated in the EGR cooler body), so that it is difficult to efficiently warm the EGR cooler body.

Hence, in the EGR cooler 400 in the embodiment, a material that generates heat when adsorbing a predetermined working gas is used as the exothermic body that is contained in the exothermic body containing portion 407, and a working gas tank 402 in which the working gas is stored is disposed outside the EGR cooler body 401. Furthermore, there is provided a gas moving apparatus that moves the working gas stored in the working gas tank 402 from the working gas tank 402 to the exothermic body containing portion 407.

Here, as the exothermic body that generates heat when adsorbing the working gas, a substance that can physically adsorb the working gas with the phase change of the working gas from the gas phase to the liquid phase can be used. As a substance satisfying such a condition, for example, a porous metal organic framework (MOF), zeolite or the like can be used. Further, when the MOF or zeolite is used as the exothermic body, for example, a material resulting from vaporizing a substance such as water, ammonia, alcohol (for example, methanol or ethanol), carbon dioxide or sulfur trioxide can be used as the working gas. In the case where the exothermic body and the working gas are determined based on one combination of those combinations, when the exothermic body adsorbs the working gas, the exothermic body can generate heat due to the latent heat generated in association with the phase change of the working gas.

As the exothermic body that generates heat when adsorbing the working gas, a substance that can chemically adsorb the working gas by a chemical reaction with the working gas can be also used. As a substance satisfying such a condition, a halide (for example, $SrCl_2$, $CaCl_2$, $MgCl_2$, $MgBr_2$, or $MgF_2$), a sulfate (for example, $MgSO_4$), an oxide (for example, MgO or CaO), or a metal (for example, a metal that forms a hydrogen adsorbing alloy or an oxide, as exemplified by Pd) can be used. When the halide, sulfate, or oxide is used as the exothermic body, the same working gas as the working gas when the above MOF or zeolite is used as the exothermic body may be used. When the metal is used as the exothermic body, oxygen, hydrogen or the like may be used as the working gas. In the case where the exothermic body and the working gas are determined based on one combination of those combinations, when the exothermic body adsorbs the working gas, the exothermic body can generate heat due to the reaction heat generated in association with a chemical reaction of the working gas and the exothermic body.

The gas moving apparatus according to the embodiment includes a communication passage 403 that provides communication between the working gas tank 402 disposed outside the EGR cooler body 401 and the exothermic body containing portion 407 in the EGR cooler body 401, a switching valve 404 that is provided in the middle of the communication passage 403, and an electronic control unit (ECU) 5. The switching valve 404 is a valve apparatus that switches the communication passage 403 between a conducted state and a blocked state. The ECU 5 is a device that electrically controls the switching valve 404, and a specific configuration of the ECU 5 will be described later. When the working gas is stored in the working gas tank 402 in the production process for the EGR cooler 400 according to the embodiment, the working gas is put in the working gas tank 402, after the switching valve 404 is closed (the communication passage 403 is blocked) while the interior of the exothermic body containing portion 407, the interior of the communication passage 403 and the interior of the working gas tank 402 are in a vacuum state.

Operation of EGR Cooler

Figure 3:
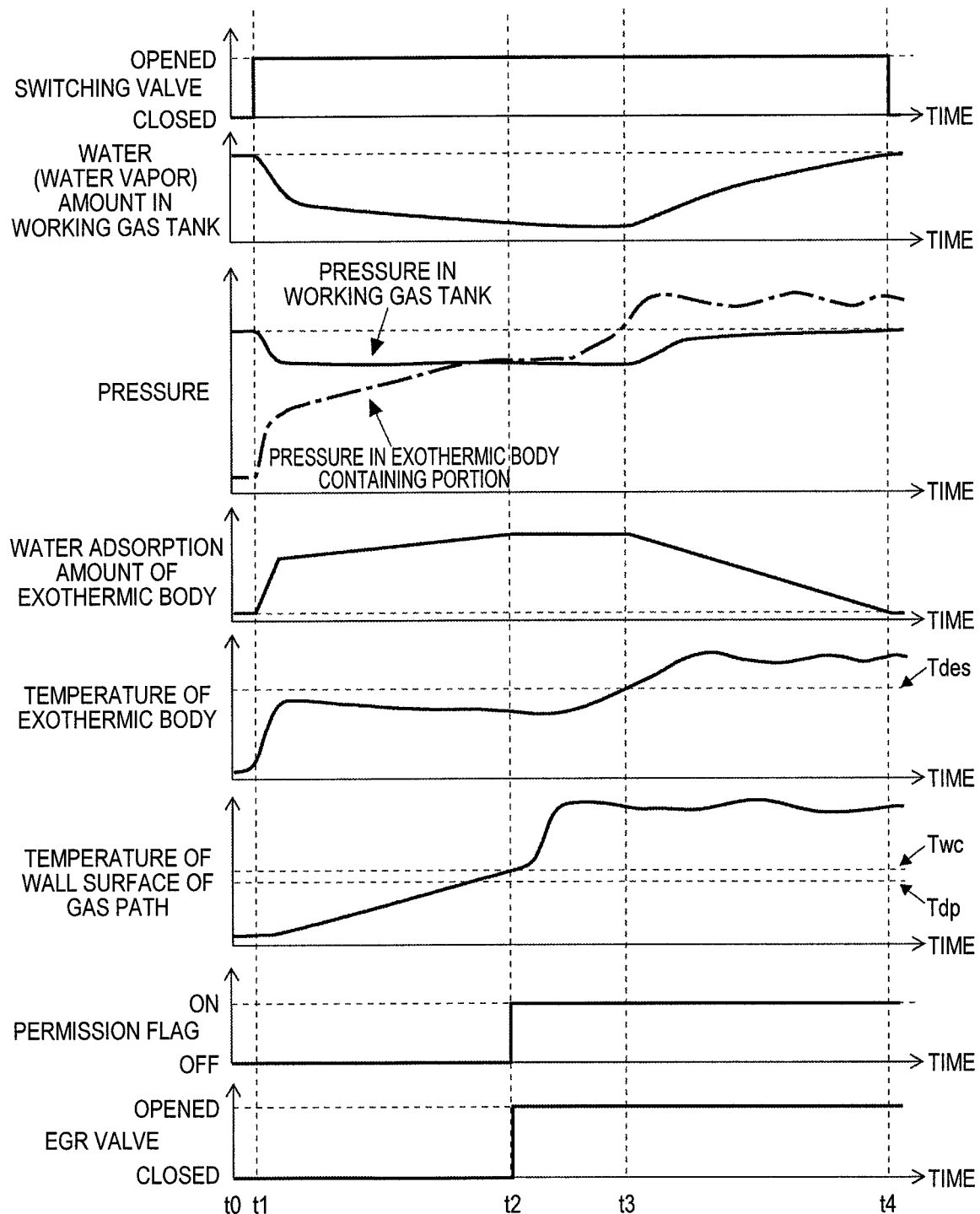
FIG. 3 is a timing chart showing the state of a switching valve, the water (water vapor) amount in a working gas tank, the pressure in the working gas tank, the pressure in an exothermic body containing portion, the temperature of an exothermic body, the temperature of a wall surface of a gas path, the state of a permission flag and the state of an EGR valve in the case of a cold start of the internal combustion engine, in time series.
Figure 4:
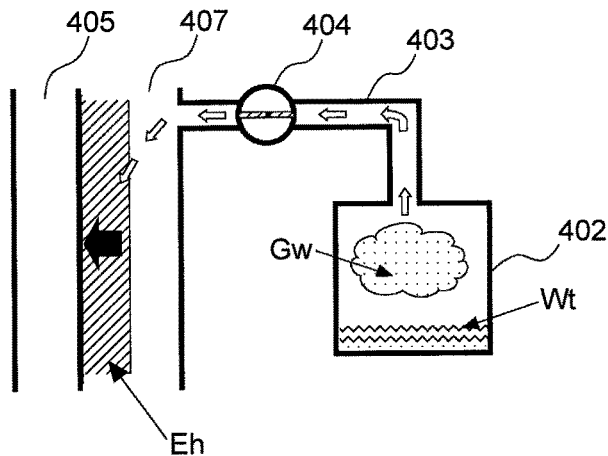
FIG. 4 is a diagram showing a behavior of the working gas when the EGR cooler is in a cold state.
Figure 5:
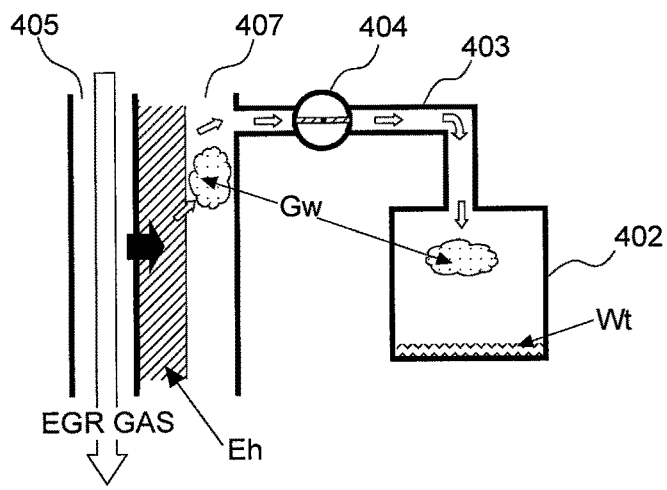
FIG. 5 is a diagram showing a behavior of the working gas when the EGR cooler is in a warm state.
Figure 6:
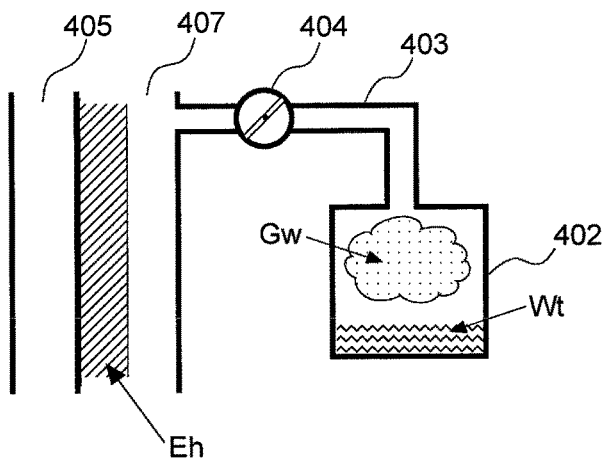
FIG. 6 is a diagram showing a state where the working gas is stored in a working gas tank.

The operation of the EGR cooler 400 will be described based on FIG. 3 to FIG. 6. Hereinafter, it is assumed that the MOF is used as the exothermic body and water (water vapor) is used as the working gas. In that case, it is assumed that the exothermic body is formed such that the pore size of pores of the MOF is larger than the molecular size of water (water vapor). This is for the purpose of making water (water vapor) easily enters the pores of the MOF and thereby the MOF adsorbs water (water vapor) more surely. FIG. 3 is a timing chart showing the state of the switching valve 404, the pressures in the working gas tank 402 and the exothermic body containing portion 407, the working gas amount (water (water vapor) amount) in the working gas tank 402, the temperature of the exothermic body (MOF), the temperature of the wall surface of the gas path 405, the state of a permission flag and the state of the EGR valve 41 in the case of the cold start of the internal combustion engine 1, in time series. In FIG. 3, it is assumed that most water (water vapor), that is, a predetermined amount or more of water (water vapor), is stored in the working gas tank 402 in a state of a liquid phase and/or a gas phase, at the time point of the cold start of the internal combustion engine 1 (at t0 in FIG. 3). The permission flag in FIG. 3 is a flag which is turned off when it is estimated that the condensed water can be generated by the circulation of the EGR gas along the gas path 405 of the EGR cooler body 401 and which is turned on when it is estimated that the condensed water cannot be generated by the circulation of the EGR gas along the gas path 405 of the EGR cooler body 401. More specifically, the permission flag is turned off when it is estimated that the temperature of the wall surface of the gas path 405 is lower than a predetermined warm-up completion temperature Twc higher than a dew point Tdp of the EGR gas (that is, a temperature resulting from adding a margin to a dew point Tdp of the EGR gas), and is turned on when it is estimated that the temperature of the wall surface of the gas path 405 is equal to or higher than the warm-up completion temperature Twc. FIG. 4 is a diagram showing a behavior of the working gas when the EGR cooler body 401 is in the cold state. FIG. 5 is a diagram showing a behavior of the working gas when the EGR cooler body 401 is in the warm state. FIG. 6 is a diagram showing a state where the working gas is stored in the working gas tank 402.

As shown in FIG. 3, at the time point of the cold start of the internal combustion engine 1 (t0 in FIG. 3), the EGR cooler body 401 is in the cold state (that is, a state where it is estimated that the temperature of the wall surface of the gas path 405 is lower than the warm-up completion temperature Twc). If the EGR valve 41 is opened when the EGR cooler body 401 is in the cold state, there is a concern that the condensed water is generated by the contact between the EGR gas and the wall surface of the gas path 405 when the EGR gas flows along the gas path 405 of the EGR cooler body 401. Therefore, in the embodiment, when the EGR cooler body 401 is in the cold state, the permission flag is in the off-state, and the warm-up of the EGR cooler body 401 is performed. The warm-up of the EGR cooler body 401 herein is performed using the heat that is generated when the exothermic body in the exothermic body containing portion 407 adsorbs water (water vapor). For realizing the warm-up of the EGR cooler body 401 by such a method, it is necessary to move water (water vapor) stored in the working gas tank 402, from the working gas tank 402 to the exothermic body containing portion 407. Here, at the time of the cold start of the internal combustion engine 1 (t0 in FIG. 3), the temperature in the working gas tank 402 and the temperature in the exothermic body containing portion 407 are nearly equivalent to each other (for example, a temperature equivalent to the outside air temperature). In such a situation, when most (a predetermined amount or more of) water (water vapor) is stored in the working gas tank 402, the pressure in the working gas tank 402 becomes nearly the saturation vapor pressure of water (water vapor), and the pressure in the exothermic body containing portion 407 of the EGR cooler body 401 becomes nearly the vacuum pressure. Therefore, the pressure in the working gas tank 402 becomes higher than the pressure in the exothermic body containing portion 407. Accordingly, when the ECU 5 switches the switching valve 404 from the valve-closed state to the valve-opened state immediately after the cold start of the internal combustion engine 1 (t1 in FIG. 3), the communication passage 403 is switched from the blocked state to the conducted, state. Then, as shown in FIG. 4, the water vapor (Gw in FIG. 4) stored in the working gas tank 402 inevitably moves from the working gas tank 402 to the exothermic body containing portion 407 through the communication passage 403, (see white arrows in FIG. 4). Further, when the pressure in the working gas tank 402 becomes lower than the saturation vapor pressure of water in association with the conduction of the communication passage 403, the water (Wt in FIG. 4) stored in the liquid phase state in the working gas tank 402 inevitably moves from the working gas tank 402 to the exothermic body containing portion 407 with the phase change to the gas phase. Thus, with the gas moving apparatus according to the embodiment, when the water (water vapor) stored in the working gas tank 402 is moved from the working gas tank 402 to the exothermic body containing portion 407, it is possible to realize the movement of the working gas from the working gas tank 402 to the exothermic body containing portion 407, without using a mechanism that forcibly moves the working gas, as exemplified by a pump. The movement of the water (water vapor) from the working gas tank 402 to the exothermic body containing portion 407 is continued until the pressure in the working gas tank 402 and the pressure in the exothermic body containing portion 407 balance each other. Here, the amount of the water (water vapor) to be put in the working gas tank 402 is adjusted in the production process for the EGR cooler 400, such that a predetermined amount or more of water (water vapor) among the water (water vapor) stored in the working gas tank 402 moves from the working gas tank 402 to the exothermic body containing portion 407. The "predetermined amount" herein is an amount that allows the temperature of the wall surface of the gas path 405 of the EGR cooler body 401 to rise to equal to or higher than the above warm-up completion temperature Twc, and is an amount that corresponds to most of the working gas to be filled into the working gas path including the exothermic body containing portion 407, the communication passage 403 and the working gas tank 402.

The water (water vapor) moved from the working gas tank 402 to the exothermic body containing portion 407 is adsorbed by the exothermic body (Eh in FIG. 4) contained in the exothermic body containing portion 407. On that occasion, since the exothermic body is formed such that the pore size of the MOF as the exothermic body is larger than the molecular size of water (water vapor) as described above, the water (water vapor) moved from the working gas tank 402 to the exothermic body containing portion 407 easily enters the pores of the exothermic body, and therefore, the exothermic body adsorbs the water (water vapor) more surely. Then, when the exothermic body adsorbs the water (water vapor), latent heat is generated in association with the phase change of the water (water vapor) from water vapor in the gas phase to water in the liquid phase, and therefore, the exothermic body generates heat due to the latent heat. Here, as described above with FIG. 2, the exothermic body is disposed so as to contact with the partition wall forming the gas path 405. Therefore, the heat generated in the exothermic body is directly transferred to the wall surface of the gas path 405 (see a black arrow in FIG. 4). Thereby, the ratio of the heat transferred to the wall surface of the gas path 405 to the heat generated in the exothermic body increases, and therefore, it is possible to efficiently warm the wall surface of the gas path 405. Accordingly, it is possible to quickly raise the temperature of the wall surface of the gas path 405.

The wall surface of the gas path 405 is warmed by the heat generated in the exothermic body, and then, when it is estimated that the temperature of the wall surface of the gas path 405 has risen to equal to or higher than the warm-up completion temperature Twc (t2 in FIG. 3), the permission flag is switched from the off-state to the on-state. On that occasion, when the operation state of the internal combustion engine 1 is in an EGR execution region, the EGR valve 41 is switched from the valve-closed state to the valve-opened state. That is, in the case of the satisfaction of a predetermined EGR gas circulation condition including the condition that the operation state of the internal combustion engine 1 is in the EGR execution region, the condition that the permission flag is in the on-state, and the like, the EGR valve 41 is switched from the valve-closed state to the valve-opened state, and the EGR gas flows along the gas path 405 in the EGR cooler body 401. In that case, the temperature of the wall surface of the gas path 405 has risen to equal to or higher than the warm-up completion temperature Twc that is higher than the dew point Tdp of the EGR gas. Therefore, even when the EGR gas comes into contact with the wall surface of the gas path 405, the moisture contained in the EGR gas is restrained from being condensed, so that the generation of the condensed water is restrained. In the example shown in FIG. 3, the EGR valve 41 is switched from the valve-closed state to the valve-opened state, at the time point when it is estimated that the temperature of the wall surface of the gas path 405 has risen to equal to or higher than the warm-up completion temperature Twc, in other words, at the time point (t2 in FIG. 3) when the permission flag is switched from the off-state to the on-state. However, the timing when the EGR valve 41 is switched from the valve-closed state to the valve-opened state can be appropriately changed depending on the operation state of the internal combustion engine 1, as long as the timing is a timing after the time point (t2 in FIG. 3) when it is estimated that the temperature of the wall surface of the gas path 405 has risen to equal to or higher than the warm-up completion temperature Twc.

Further, when the warm-up of the EGR cooler body 401 is performed by the above method, the predetermined amount or more of water (water vapor) that is contained in the water (water vapor) stored in the working gas tank 402 is adsorbed in the exothermic body. Therefore, for realizing the efficient and effective warm-up of the EGR cooler body 401 by the above method also at the time of the next operation of the internal combustion engine 1, it is necessary to desorb the water (water vapor) adsorbed in the exothermic body, from the exothermic body, and to move the water (water vapor) desorbed from the exothermic body, from the exothermic body containing portion 407 to the working gas tank 402.

For desorbing, from the exothermic body, the water (water vapor) adsorbed in the exothermic body, it is necessary to raise the temperature of the exothermic body to equal to or higher than a predetermined desorption temperature Tdes. The predetermined desorption temperature Tdes herein is the minimum temperature at which the water (water vapor) adsorbed in the MOF as the exothermic body is desorbed from the MOF. Since the EGR valve 41 is switched from the valve-closed state to the valve-opened state after it is estimated that the temperature of the wall surface of the gas path 405 has risen to equal to or higher than the warm-up completion temperature Twc and the permission flag is switched from the off-state to the on-state (after t2 in FIG. 3), the heat of the EGR gas is transferred to the exothermic body in the exothermic body containing portion 407 through the wall surface of the gas path 405, when the EGR gas flows along the gas path 405 of the EGR cooler body 401. On that occasion, the temperature of the EGR gas is sufficiently higher than the desorption temperature Tdes, and therefore, the temperature of the exothermic body rises to a temperature equal to or higher than the desorption temperature Tdes (t3 in FIG. 3). Here, when the heat of the EGR gas continues to be transferred to the exothermic body as described above, there is a concern of the overheating of the exothermic body. However, as described above with FIG. 2, the exothermic body in the exothermic body containing portion 407 is disposed so as to contact also with the partition wall forming the refrigerant path 406. Therefore, some of the heat transferred from the EGR gas to the exothermic body is released to the coolant flowing through the refrigerant path 406, through the partition wall forming the refrigerant path 406. Accordingly, even when the heat of the EGR gas continues to be transferred to the exothermic body, the overheating of the exothermic body is restrained.

Further, for moving the water (water vapor) desorbed from the exothermic body, from the exothermic body containing portion 407 to the working gas tank 402, the pressure in the exothermic body containing portion 407 needs to be higher than the pressure in the working gas tank 402 in a state where the switching valve 404 is opened. Here, when the temperature of the exothermic body rises to equal to or higher than the desorption temperature Tdes (that is, the EGR cooler body 401 becomes the warm state) and thereby the water (water vapor) adsorbed in the exothermic body is desorbed from the exothermic body, the amount of the water (water vapor) in the exothermic body containing portion 407 becomes more than the amount of the water (water vapor) in the working gas tank 402, so that the pressure in the exothermic body containing portion 407 becomes higher than the pressure in the working gas tank 402. Therefore, the switching valve 404, which is switched from the valve-closed state to the valve-opened state at the start of the warm-up of the EGR cooler body 401 (at t1 in FIG. 3), continues to be opened even after the temperature of the exothermic body reaches the desorption temperature Tdes (after t3 in FIG. 3). Thereby, as shown in FIG. 5, when the temperature of the exothermic body rises to equal to or higher than the desorption temperature Tdes, the water (water vapor) adsorbed in the exothermic body is desorbed from the exothermic body with the phase change from water in the liquid phase to water vapor (Gw in FIG. 5) in the gas phase, and furthermore, the water (water vapor) desorbed from the exothermic body inevitably moves from the exothermic body containing portion 407 to the working gas tank 402 through the communication passage 403 (see white arrows in FIG. 5). On that occasion, when the temperature in the working gas tank 402 is sufficiently lower than the temperature in the exothermic body containing portion 407, the water vapor moved from the exothermic body containing portion 407 to the working gas tank 402 changes to water (Wt in FIG. 5) in the liquid phase. Thus, with the gas moving apparatus according to the disclosure, when the water (water vapor) adsorbed in the exothermic body is collected in the working gas tank 402, it is possible to realize the desorption of the water (water vapor) adsorbed in the exothermic body and the movement of the water (water vapor) desorbed from the exothermic body from the exothermic body containing portion 407 to the working gas tank 402, without using a mechanism that forcibly heats the exothermic body, as exemplified by a heater, and a mechanism that forcibly moves the working gas, as exemplified by a pump.

After the water (water vapor) adsorbed in the exothermic body is collected in the working gas tank 402 by the above method, the water (water vapor) collected in the working gas tank 402 needs to be stored in the working gas tank 402, until the next warm-up of the EGR cooler body 401 is needed (that is, until a time immediately after the next cold start of the internal combustion engine 1). Hence, in the embodiment, at a predetermined blocking timing (t4 in FIG. 3) after the temperature of the exothermic body exceeds the desorption temperature Tdes, the switching valve 404 is switched from the valve-opened state to the valve-closed state by the ECU 5. The "predetermined blocking timing" herein is an estimated timing when the Water (water vapor) adsorbed in the exothermic body is completely desorbed from the exothermic body and the water (water vapor) desorbed from the exothermic body is completely moved from the exothermic body containing portion 407 to the working gas tank 402. Here, the state where "the water (water vapor) adsorbed in the exothermic body is completely desorbed from the exothermic body" is not limited to a state where the whole amount of the water (water vapor) adsorbed in the exothermic body is desorbed from the exothermic body, and may correspond to a state where a predetermined amount or more of water (water vapor) that is contained in the water (water vapor) adsorbed in the exothermic body is desorbed from the exothermic body. Similarly, the state where "the water (water vapor) desorbed from the exothermic body is completely moved from the exothermic body containing portion 407 to the working gas tank 402" is not limited to a state where the whole amount of the water (water vapor) desorbed from the exothermic body is moved from the exothermic body containing portion 407 to the working gas tank 402, and may correspond to a state where a predetermined amount or more of water (water vapor) that is contained in the water (water vapor) desorbed from the exothermic body is moved from the exothermic body containing portion 407 to the working gas tank 402. In short, it is only necessary that the working gas having an amount, which allows the exothermic body to adsorb a predetermined amount or more of working gas when the communication passage 403 is switched from the blocked state to the conducted state by the switching valve 404 immediately after the next cold start of the internal combustion engine 1, is desorbed from the exothermic body and is returned to the working gas tank 402. Therefore, the blocking timing can be regarded as an estimated timing when the amount of the water (water vapor) in the working gas tank 402 reaches an amount nearly equivalent to the amount of the water (water vapor) immediately before t1 in FIG. 3, or an estimated timing when the water adsorption amount of the exothermic body decreases to an amount nearly equivalent to the water adsorption amount immediately before t1 in FIG. 3, or an estimated timing when the pressure in the working gas tank 402 reaches an amount nearly equivalent to the pressure immediately before t1 in FIG. 3. The above blocking timing may be set to a timing when the operation of the internal combustion engine 1 is stopped (that is, a timing when an unillustrated ignition switch is switched from the on-state to the off-state). The reason is shown as follows. When the operation of the internal combustion engine 1 is continued after the temperature of the exothermic body exceeds the desorption temperature Tdes, the temperature of the exothermic body containing portion 407 is unlikely to fall below the temperature of the working gas tank 402, and therefore, the pressure in the exothermic body containing portion 407 is unlikely to fall below the pressure in the working gas tank 402. Accordingly, even when the switching valve 404 continues to be opened until the timing when the operation of the internal combustion engine 1 is stopped after the water (water vapor) adsorbed in the exothermic body is completely collected in the working gas tank 402, the water (water vapor) collected in the working gas tank 402 is unlikely to move from the working gas tank 402 to the exothermic body containing portion 407.

It is not necessary to open the switching valve 404 continuously until the above blocking timing after the switching valve 404 is opened for the warm-up of the EGR cooler body 401. The water (water vapor) adsorbed in the exothermic body may be collected in the working gas tank 402, by temporarily closing the switching valve 404 at the time point (t2 in FIG. 3) when it is estimated that the temperature of the wall surface of the gas path 405 has risen to equal to or higher than the warm-up completion temperature Twc and thereafter opening the switching valve 404 again at the time point (t3 in FIG. 3) when it is estimated that the temperature of the exothermic body has risen to the desorption temperature Tdes.

When the switching valve 404 is switched from the valve-opened state to the valve-closed state at the above blocking timing, the water (water vapor) collected from the exothermic body containing portion 407 to the working gas tank 402 is stored in the working gas tank 402, as shown in FIG. 6. As a result, when the next warm-up of the EGR cooler body 401 is needed, the switching valve 404 is switched from the valve-closed state to the valve-opened state, and thereby, the above-described operations in FIG. 4 and FIG. 5 can be performed again.

The EGR cooler 400 configured as described above is provided with the ECU 5. The ECU 5 in the embodiment serves also as an ECU for controlling the operation state of the internal combustion engine 1 and the like. However, the ECU for controlling the operation state of the internal combustion engine 1 and the like may be separately provided. The ECU 5 is constituted by a CPU, a ROM, a RAM, a backup RAM, and the like. The ECU 5 receives detection signals of various sensors such as a temperature sensor 6, an unillustrated air flow meter and an unillustrated air-fuel ratio sensor. The temperature sensor 6 herein is a sensor that detects the temperature of a coolant to circulate in the internal combustion engine 1. The ECU 5 is electrically connected to various devices such as an unillustrated fuel injection valve, in addition to the above-described EGR valve 41 and switching valve 404, and is configured to be able to control the various devices. For example, the ECU 5 performs a warm-up control of the EGR cooler body 401, in addition to known controls such as a fuel injection control.

Warm-Up Control Flow of EGR Cooler Body

Figure 7:
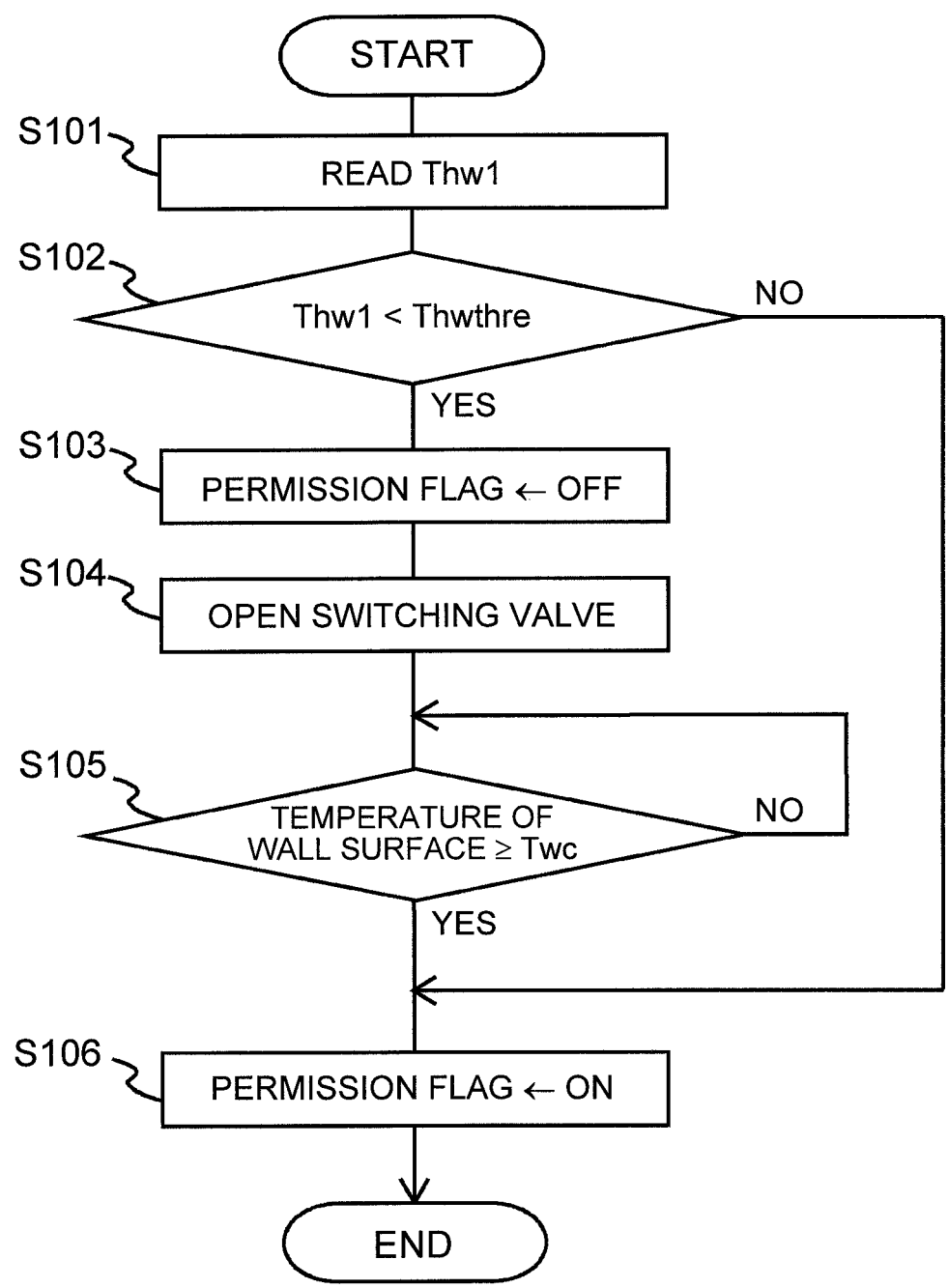
FIG. 7 is a flowchart showing a processing routine that is executed by an ECU when a switching valve is switched from a valve-closed state to a valve-opened state.
Figure 8:
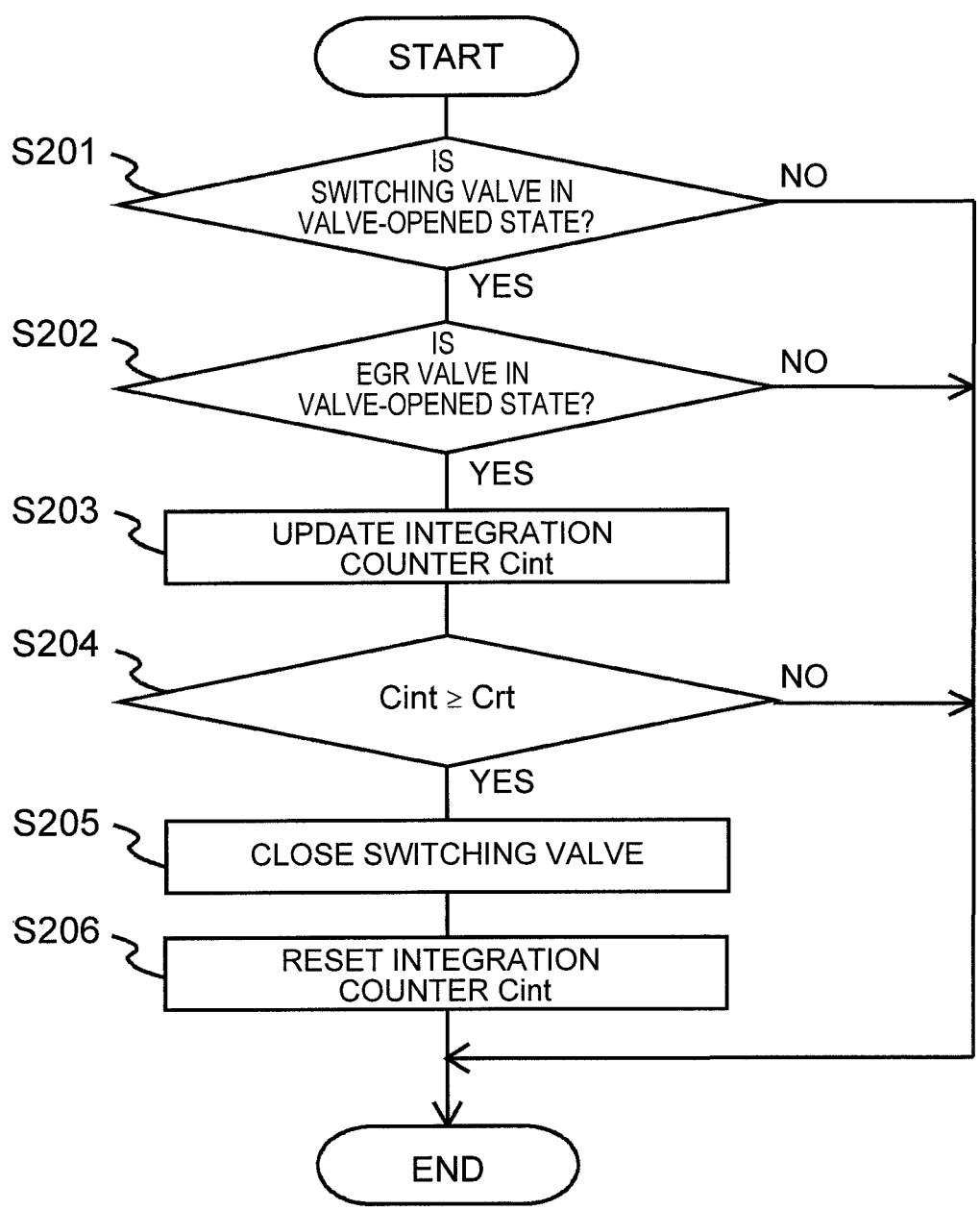
FIG. 8 is a flowchart showing a processing routine that is executed by the ECU when the switching valve is switched from the valve-opened state to the valve-closed state.

Here, the warm-up control of the EGR cooler body 401 that is executed by the ECU 5 will be described with FIG. 7 and FIG. 8. FIG. 7 is a flowchart showing a processing routine that is executed by the ECU 5 when the switching valve 404 is switched from the valve-closed state to the valve-opened state. The execution of the processing routine shown in FIG. 7 is triggered by the start of the internal combustion engine 1. On the other hand, FIG. 8 is a flowchart showing a processing routine that is executed by the ECU 5 when the switching valve 404 is switched from the valve-opened state to the valve-closed state. The processing routine shown in FIG. 8 is repeatedly executed with a predetermined period during the operation of the internal combustion engine 1.

First, in the processing routine in FIG. 7, the ECU 5 reads a coolant temperature Thw1 detected by the temperature sensor 6, in the process of S101. Subsequently, in the process of S102, the ECU 5 determines whether the coolant temperature Thw1 read in the process of S101 is lower than a predetermined threshold Thwthre. The "predetermined threshold Thwthre" herein is a temperature allowing an estimation that the temperature of the wall surface of the gas path 405 is lower than the warm-up completion temperature Twc and the temperature of the exothermic body is lower than the desorption temperature Tdes when the coolant temperature Thw1 is lower than the threshold Thwthre. The threshold Thwthre is evaluated in advance, based on a result of an experiment or a simulation. Here, the coolant temperature Thw1 is an example of "the temperature of the internal combustion engine at the start of the internal combustion engine" in the present disclosure.

It is expected that the temperature of the wall surface of the gas path 405 and the temperature of the exothermic body are nearly equivalent to each other (for example, equivalent to the outside air temperature) immediately after the cold start of the internal combustion engine 1. Therefore, a temperature sensor for measuring the temperature of the wall surface of the gas path 405 or the temperature of the exothermic body may be attached to the EGR cooler body 401, or a temperature sensor for measuring the outside air sensor may be provided with the EGR cooler 400, and it may be estimated that the temperature of the wall surface of the gas path 405 is lower than the warm-up completion temperature Twc and the temperature of the exothermic body is lower than the desorption temperature Tdes, when the temperature measured by the temperature sensor is lower than the warm-up completion temperature Twc (<Tdes).

In the case where the positive determination is made in the process of S102 (Thw1<Thwthre), it is estimated that the temperature of the wall surface of the gas path 405 is lower than the warm-up completion temperature Twc as described above. Therefore, when the EGR gas flows along the gas path 405 of the EGR cooler body 401 in such a situation, there is a concern that the condensed water is generated by the contact between the EGR gas and the wall surface of the gas path 405. Hence, in the case where the positive determination is made in the process of S102, the ECU 5 proceeds to the process of S103, and turns the permission flag off. In this case, the above EGR gas circulation condition is not satisfied, and therefore, the EGR valve 41 is not opened. When the EGR valve 41 is not opened in the situation where it is estimated that the temperature of the wall surface of the gas path 405 is lower than the warm-up completion temperature Twc, the flow of the EGR gas from the exhaust passage 3 through the EGR passage 40 toward the intake passage 2 is blocked, so that the EGR gas does not flow along the gas path 405 of the EGR cooler body 401. As a result, the generation of the condensed water in the EGR cooler body 401 is restrained.

After the ECU 5 ends the execution of the process of S103, the ECU 5 proceeds to the process of S104, and starts the warm-up of the EGR cooler body 401. Specifically, the ECU 5 switches the switching valve 404 from the valve-closed state to the valve-opened state, to switch the communication passage 403 from the blocked state to the conducted state (the process corresponds to the above-described process at t1 in FIG. 3). Here, when the EGR cooler body 401 is in the cold state, for example, immediately after the cold start of the internal combustion engine 1, (that is, when it is estimated that the temperature of the wall surface of the gas path is lower than the warm-up completion temperature Twc), it is expected that the temperature in the working gas tank 402 and the temperature in the exothermic body containing portion 407 are nearly equivalent to each other, as described above with FIG. 3. In such a state, when a predetermined amount or more of water (water vapor) is stored in the working gas tank 402, the pressure in the working gas tank 402 becomes nearly the saturation vapor pressure of water (water vapor), and the pressure in the exothermic body containing portion 407 becomes nearly the vacuum pressure. As a result, the pressure in the working gas tank 402 becomes higher than the pressure in the exothermic body containing portion 407. Therefore, when the switching valve 404 is switched from the valve-closed state to the valve-opened state in the process of S104, the water (water vapor) stored in the working gas tank 402 inevitably moves from the working gas tank 402 to the exothermic body containing portion 407 of the EGR cooler body 401, as described above with FIG. 4. Then, the water (water vapor) moved from the working gas tank 402 to the exothermic body containing portion 407 is adsorbed by the exothermic body of the exothermic body containing portion 407, so that the phase of the water (water vapor) changes from the gas phase to the liquid phase. Thereby, the exothermic body generates heat due to the latent heat associated with the phase change of the water (water vapor). When the exothermic body generates heat as described above, the heat is transferred from the exothermic body to the wall surface of the gas path 405. On that occasion, since the exothermic body in the exothermic body containing portion 407 is disposed so as to contact with the partition wall forming the gas path 405, the heat generated by the exothermic body is directly transferred from the exothermic body to the wall surface of the gas path 405. As a result, the ratio of the heat transferred to the wall surface of the gas path to the heat generated by the exothermic body increases. Accordingly, it is possible to efficiently warm the wall surface of the gas path 405.

After the ECU 5 ends the execution of the process of S104, the ECU 5 proceeds to the process of S105, and determines whether the temperature of the wall surface of the gas path 405 has risen to equal to or higher than the warm-up completion temperature Twc. On that occasion, for example, the ECU 0.5 may measure the elapsed time from the time point when the switching valve 404 is opened in the process of S104. Then, the ECU 5 may determine that the temperature of the wall surface of the gas path 405 has risen to equal to or higher than the warm-up completion temperature Twc, when the elapsed time is equal to or longer than a predetermined temperature rise time, and may determine that the temperature of the wall surface of the gas path 405 is lower than the warm-up completion temperature Twc, when the elapsed time is shorter than the predetermined temperature rise time. The "predetermined temperature rise time" herein is a time required from the switching valve 404 is opened for the start of the warm-up of the EGR cooler body 401 and until the temperature of the wall surface of the gas path 405 rises to equal to or higher than the warm-up completion temperature Twc. The time required from the switching valve 404 is opened for the start of the warm-up of the EGR cooler body 401 and until the temperature of the wall surface of the gas path 405 rises to equal to or higher than the warm-up completion temperature Twc correlates with the temperature of the wall surface of the gas path 405 at the start of the warm-up of the EGR cooler body 401 and the heat generation amount of the exothermic body per unit time. Here, it is expected that the temperature of the wall surface of the gas path 405 at the start of the warm-up of the EGR cooler body 401 is nearly equivalent to the outside air temperature. Further, it is expected that the coolant temperature at the time of the cold start of the internal combustion engine 1 is also nearly equivalent to the outside air temperature. Therefore, it can be estimated that the temperature of the wall surface of the gas path 405 at the start of the warm-up of the EGR cooler body 401 is nearly equivalent to the coolant temperature Thw1 at the time of the cold start of the internal combustion engine 1. Meanwhile, the heat generation amount of the exothermic body per unit time can be regarded as being nearly constant. In light of these correlations and tendencies, the above temperature rise time can be determined using the coolant temperature Thw1 read in the process of S101 as a parameter. For example, the above temperature rise time can be determined so as to be longer when, the coolant temperature Thw1 is low than when the coolant temperature Thw1 is high. Here, the correlation between the above temperature rise time and the coolant temperature Thw1 may be stored in a ROM or the like of the ECU 5 in advance, as a map or relational expression in which the coolant temperature Thw1 is a parameter. As another method of determining whether the temperature of the wall surface of the gas path 405 has risen to equal to or higher than the warm-up completion temperature Twc, a temperature sensor for measuring the temperature of the wall surface of the gas path 405 may be attached to the EGR cooler body 401, and it may be determined whether the measurement value of the temperature sensor is equal to or higher than the warm-up completion temperature Twc.

Here, if the EGR gas flows along the gas path 405 when the temperature of the wall surface of the gas path 405 is lower than the warm-up completion temperature Twc, there is a concern that the condensed water is generated by the contact between the EGR gas and the wall surface of the gas path 405. Therefore, in the case where the negative determination is made in the process of S105 (the temperature of the wall surface<Twc), the ECU 5 executes the process of S105 again, while maintaining the off-state of the permission flag. On the other hand, if the EGR gas flows along the gas path 405 of the EGR cooler body 401 when the temperature of the wall surface of the gas path 405 is equal to or higher than the warm-up completion temperature Twc, it is estimated that the condensed water cannot be generated by the contact between the EGR gas and the wall surface of the gas path 405. Therefore, in the case where the positive determination is made in the process of S105 (the temperature of the wall surface Twc), the ECU 5 proceeds to the process of S106, and turns the permission flag on. After the ECU 5 ends the execution of the process of S106, the ECU 5 ends the execution of the processing routine.

In the case where the negative determination is made in the process of S102 (Thw1≥Thwthre), it can be estimated that the temperature of the wall surface of the gas path 405 is equal to or higher than the warm-up completion temperature Twc. Therefore, the ECU 5 proceeds to the process of S106 by skipping the processes of S103 to S105, and turns the permission flag on.

In this way, the switching valve 404 of the EGR cooler 400 is controlled in accordance with the processing routine in FIG. 7, and thereby, it is possible to warm the wall surface of the gas path 405 efficiently and effectively, when the EGR cooler body 401 is in the cold state. Further, since it is possible to warm the wall surface of the gas path 405 efficiently and effectively, it is possible to reduce the amount of the exothermic body to be contained in the exothermic body containing portion 407 and the amount of the water (water vapor) to be stored in the working gas tank 402 to relatively small amounts, and it is possible to raise the temperature of the wall surface of the gas path 405 to a temperature at which the condensed water is restrained from being generated (that is, a temperature equal to or higher than the warm-up completion temperature Twc). As a result, it is possible to suppress the increase in the size of the EGR cooler body 401 and the increase in the size of the working gas tank 402, and therefore, it is possible to suppress the decrease in the vehicle-mounting-ability of the EGR apparatus 4 including the EGR cooler 400.

In the processing routine in FIG. 8, first, the ECU 5 determines whether the switching valve 404 is in the valve-opened state, in the process of S201. In the case where the negative determination is made in the process of S201, it can be determined that the warm-up of the EGR cooler body 401 has not been performed since the start of the internal combustion engine 1 (that is, the warm-up of the EGR cooler body 401 was not necessary because the temperature of the wall surface of the gas path 405 was not equal to or higher than the warm-up completion temperature Twc at the time point of the start of the internal combustion engine 1), or that the switching valve 404 has been already closed although the warm-up of the EGR cooler body 401 was performed after the start of the internal combustion engine 1 (that is, the collection of the water (water vapor) in the working gas tank 402 has been already completed after the warm-up of the EGR cooler body 401). In this case, it is not necessary to perform the process for closing the switching valve 404, and therefore, the ECU 5 ends the execution of the processing routine. On the other hand, in the case where the positive determination is made in the process of S201, it can be determined that the switching valve 404 is opened for the warm-up of the EGR cooler body 401 after the start of the internal combustion engine 1 and the valve-opened state of the switching valve 404 is continued. That is, the timing of the execution of the process of S201 is a timing after t1 in FIG. 3 and before t4. In this case, it is necessary to perform the process for opening the switching valve 404, and therefore, the ECU 5 proceeds to the processes of S202 and later.

In the process of S202, the ECU 5 determines whether the EGR valve 41 is in the valve-opened state. In the case where the negative determination is made in the process of S202, the EGR valve 41 is in the valve-closed state because the warm-up of the EGR cooler body 401 has not been completed yet (that is, the permission flag is in the off-state), or the EGR valve 41 is in the valve-closed state because the operation state of the internal combustion engine 1 is not in the EGR execution region although the warm-up of the EGR cooler body 401 has been completed (that is, the permission flag is in the on-state). In this case, the ECU 5 ends the execution of the processing routine once. On the other hand, in the case where the positive determination is made in the process of S202, the EGR valve 41 is in the valve-opened state because the warm-up of the EGR cooler body 401 has been already completed (that is, the permission flag is in the on-state) and the operation state of the internal combustion engine 1 is in the EGR execution region (that is, the above predetermined EGR gas circulation condition is satisfied). That is, the timing of the execution of the process of S202 is a timing after t2 in FIG. 3 and before t4. In this case, the ECU 5 proceeds to the process of S203.

In the process of S203, the ECU 5 updates an integration counter Cint. The integration counter Cint herein counts an integrated value (hereinafter, referred to as an "integrated valve-opened time") of a valve-opened time of the EGR valve 41 after the completion of the warm-up of the EGR cooler body 401 (after t2 in FIG. 3 described above). After the ECU 5 ends the execution of the process of S203, the ECU 5 proceeds to the process of S204.

In the process of S204, the ECU 5 determines whether the integrated valve-opened time Cint updated in the process of S203 is equal to or higher than a predetermined collection time Crt. The "predetermined collection time Crt" herein is a time required to collect, in the working gas tank 402, the water (water vapor) adsorbed in the exothermic body at the time of the warm-up of the EGR cooler body 401. As described above with FIG. 3, for collecting, in the working gas tank 402, the water (water vapor) adsorbed in the exothermic body at the time of the warm-up of the EGR cooler body 401, it is necessary to increase the temperature of the exothermic body to equal to or higher than the desorption temperature Tdes, such that the water (water vapor) is desorbed from the exothermic body, and it is necessary to increase the pressure in the exothermic body containing portion 407 to higher than the pressure in the working gas tank 402. Further, for satisfying the conditions, it is necessary to open the EGR valve 41, such that the EGR gas with a high temperature flows along the gas path 405 of the EGR cooler body 401 and the temperature of the exothermic body rises with the heat of the EGR gas. Therefore, it can be said that the time, which is required to collect the water (water vapor) adsorbed in the exothermic body to the working gas tank 402 at the time of the warm-up of the EGR cooler body 401, depends on the integrated valve-opened time Cint of the EGR valve 41 after the completion of the warm-up of the EGR cooler body 401. Hence, in the embodiment, the time required to collect nearly the whole amount of the water (water vapor), which is adsorbed in the exothermic body at the time of the warm-up of the EGR cooler body 401, to the working gas tank 402 in the valve-opened state of the EGR valve 41 after the completion of the warm-up of the EGR cooler body 401 is evaluated in advance based on a result of an experiment or a simulation, and the time evaluated in this way is set as the collection time Crt. When the integrated valve-opened time Cint is equal to or more than the collection time Crt, it is determined that the water (water vapor) adsorbed in the exothermic body at the time of the warm-up of the EGR cooler body 401 has been completely collected in the working gas tank 402. On the other hand, when the integrated valve-opened time Cint is less than the collection time Crt, it is determined that the water (water vapor) adsorbed in the exothermic body at the time of the warm-up of the EGR cooler body 401 has not been completely collected into the working gas tank 402.

In the case where the negative determination is made in the process of S204, the ECU 5 ends the execution of the processing routine once. In that case, the valve-opened state of the switching valve 404 is maintained, so that the water (water vapor) adsorbed in the exothermic body at the time of the warm-up of the EGR cooler body 401 continues to be collected into the working gas tank 402. On the other hand, in the case, where the positive determination is made in the process of S204, it is estimated that the water (water vapor) adsorbed in the exothermic body at the time of warm-up of the EGR cooler body 401 has been completely collected in the working gas tank 402, as described above. The ECU 5 proceeds to the process of S205, and switches the switching valve 404 from the valve-opened state to the valve-closed state (this timing corresponds to the blocking timing t4 in FIG. 3). Thereby, as described above with FIG. 6, the water (water vapor) collected into the working gas tank 402 is stored in the working gas tank 402. After the ECU 5 executes the process of S205, the ECU 5 proceeds to the process of S206, and resets the count value of the integrated valve-opened time Cint, to the initial value (that is, zero).

By controlling the switching valve 404 of the EGR cooler 400 in accordance with the processing routine in FIG. 8 in this way, it is possible to collect the water (water vapor), which is adsorbed in the exothermic body at the time of the warm-up of the EGR cooler body 401, into the working gas tank 402, and it is possible to store the water (water vapor) collected into the working gas tank 402 in the working gas tank 402. Thereby, it is possible to warm the wall surface of the gas path 405 of the EGR cooler body 401 efficiently and effectively, when the next warm-up of the EGR cooler body 401 is needed.

In the processing routine in FIG. 8, the timing of the closing of the switching valve 404 (that is, the blocking timing t4 in FIG. 3) is determined, using the integrated valve-opened time Cint as a parameter. However, a sensor that measures the amount of the water (water vapor) stored in the working gas tank 402 may be attached to the working gas tank 402, and the switching valve 404 may be closed at a timing when the measured value of the sensor reaches a working gas amount (for example, the amount of the water (water vapor) stored in the working gas tank 402 right before the warm-up of the EGR cooler body 401 is started). As another method, a sensor that measures the pressure in the working gas tank 402 may be attached to the working gas tank 402, and the switching valve 404 may be closed at a timing when the measured value of the sensor reaches a predetermined pressure (for example, the pressure in the working gas tank 402 right before the warm-up of the EGR cooler body 401 is started).

Here, an example of the "control unit" according to the disclosure is realized when the ECU 5 executes the processes of S101, S102, S104 and S105 of the processing routine in FIG. 7 and the processing routine in FIG. 8. An example of the "circulation control unit" according to the disclosure is realized when the ECU 5 executes the processes of S103 and S106 of the processing routine in FIG. 7.

In the embodiment, the exothermic body to be contained in the exothermic body containing portion 407 is disposed such that the exothermic body contacts with the partition wall for the partition between the exothermic body containing portion 407 and the gas path 405 and also contacts with the partition wall for the partition between the exothermic body containing portion 407 and the refrigerant path 406. However, in the case where a substance having a high heatproof temperature is used as the exothermic body to be contained in the exothermic body containing portion 407, the exothermic body may be disposed such that the exothermic body contacts with the partition wall for the partition between the exothermic body containing portion 407 and the gas path 405 but does not contact with the partition wall for the partition between the exothermic body containing portion 407 and the refrigerant path 406. With such a configuration, when the warm-up of the EGR cooler body 401 is performed, it is possible to increase the ratio of the heat transferred to the wall surface of the gas path 405 to the heat generated by the exothermic body, and therefore, it is possible to perform the warm-up of the EGR cooler body 401 more efficiently.

Second Embodiment

Figure 9:
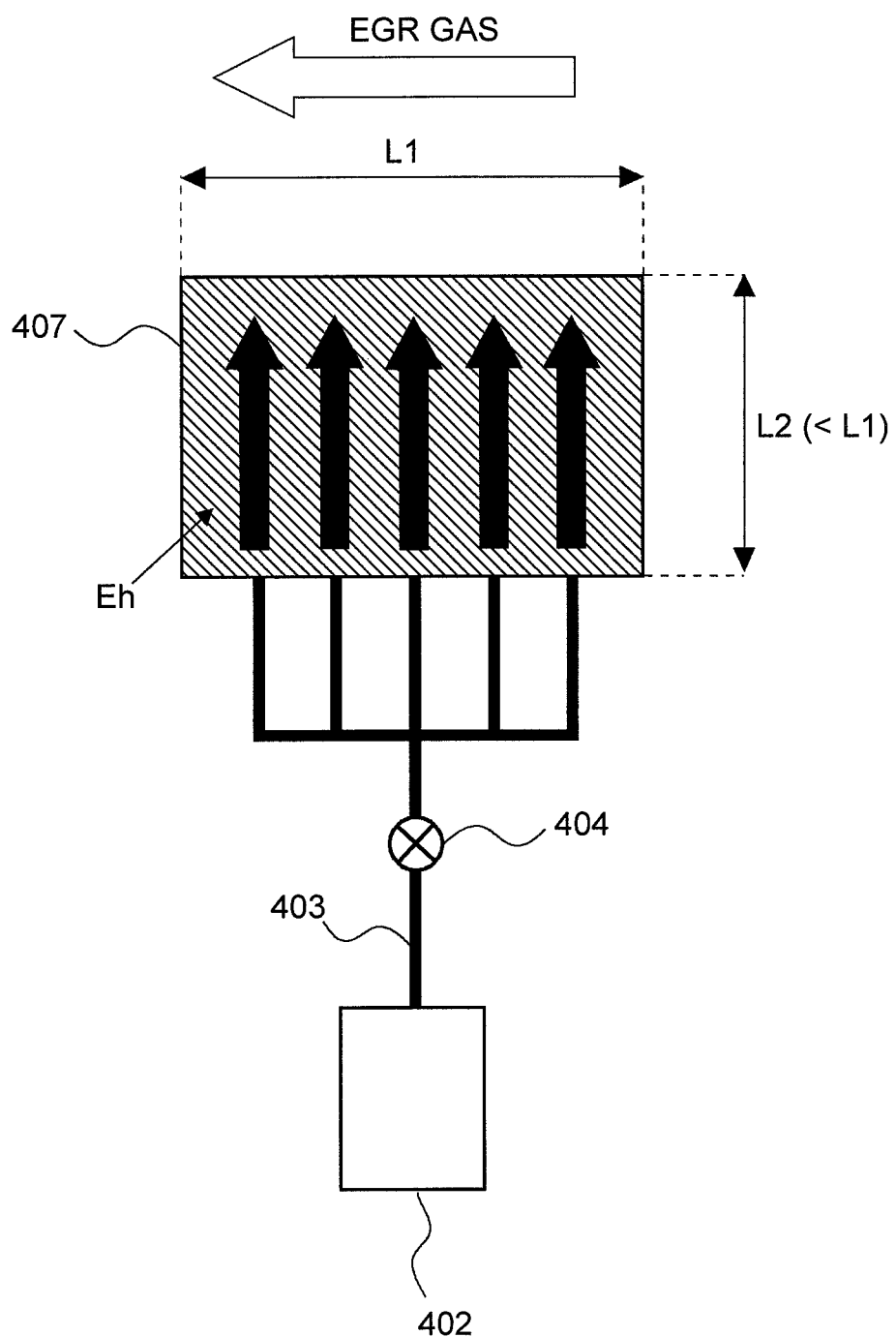
FIG. 9 is a diagram showing a connection form between the exothermic body containing portion and a communication path in a second embodiment.

Next, a second embodiment of the disclosure will be described based on FIG. 9. Here, different configurations from the above-described first embodiment will be described, and the description of the same configurations will be omitted. FIG. 9 is a diagram showing a connection form between the exothermic body containing portion and the communication passage in the embodiment. In FIG. 9, the exothermic body containing portion is shown as a plan view. Further, a white arrow in FIG. 9 shows the flow direction of the EGR gas in the EGR cooler body 401.

As shown in FIG. 9, the exothermic body (Eh) to be contained in the exothermic body containing portion 407 is formed such that a length L1 in the flow direction of the EGR gas is longer than a length L2 in the direction orthogonal to the flow direction of the EGR gas. The reason is shown as follows. For effectively cooling the EGR gas with the EGR cooler body 401, it is effective that the length (the length of the gas path 405) of the EGR cooler body 401 in the flow direction of the EGR gas is longer than the length of the EGR cooler body 401 in the direction orthogonal to the flow direction of the EGR gas. Consequently, the length L1 of the exothermic body (Eh) in the flow direction of the EGR gas is longer than the length L2 of the exothermic body (Eh) in the direction orthogonal to the flow direction of the EGR gas. For the exothermic body (Eh) formed in this way, the communication passage 403 is connected to the exothermic body containing portion 407, such that the water (water vapor) flows into the exothermic body containing portion 407 along the direction orthogonal to the flow direction of the EGR gas. That is, open ends of the communication passage 403 at a connection portion between the communication passage 403 and the exothermic body containing portion 407 is oriented in the direction orthogonal to the flow direction of the EGR gas. Furthermore, the communication passage 403 shown in FIG. 9 diverges to a plurality of branches at the upstream, when starting from the working gas tank 402, of the connection portion with the exothermic body containing portion 407, and the plurality of branches is connected to the exothermic body containing portion 407. Open ends of the branches at connection portions between the branches and the exothermic body containing portion 407 are oriented in the direction orthogonal to the flow direction of the EGR gas.

Since the communication passage 403 is connected to the exothermic body containing portion 407 in the above form, the water (water vapor) to flow from the working gas tank 402 into the exothermic body containing portion 407 through the communication passage 403 at the time of the warm-up of the EGR cooler body 401 flows into the exothermic body containing portion 407 along the direction orthogonal to the flow direction of the EGR gas, as shown by black arrows in FIG. 9, and the water (water vapor) flows into the exothermic body containing portion 407 toward a plurality of spots of the exothermic body (Eh). On that occasion, since the length L2 of the exothermic body (Eh) in the direction orthogonal to the flow direction of the EGR gas is shorter than the length L1 of the exothermic body (Eh) in the flow direction of the EGR gas as described above, the water (water vapor) flowing from the communication passage 403 into the exothermic body containing portion 407 easily runs through the whole of the exothermic body (Eh).

As a result, heat is generated from nearly the whole of the exothermic body contained in the exothermic body containing portion 407. Accordingly, when the wall surface of the gas path 405 is warmed by the heat generated from the exothermic body, the temperature of the wall surface of the gas path 405 is unlikely to be non-uniform. Therefore, it is possible to restrain the generation of the condensed water, in a wider range within the EGR cooler body 401.

In the case where the exothermic body is formed such that the length in the direction orthogonal to the flow direction of the EGR gas is longer than the length in the flow direction of the EGR gas, the communication passage may be connected to the exothermic body containing portion such that the water (water vapor) flows into the exothermic body containing portion along the flow direction of the EGR gas and the water (water vapor) flows into the exothermic body containing portion toward a plurality of spots of the exothermic body.

The method for the connection between the communication passage and the exothermic body containing portion is not limited to a method in which the direction of the water (water vapor) flowing into the exothermic body containing portion is parallel to a direction that is one of the flow direction of the EGR gas and the direction orthogonal to the flow direction of the EGR gas and in which the length of the exothermic body is relatively shorter. In short, the communication passage and the exothermic body containing portion only need to be connected such that the water (water vapor) flows into the exothermic body containing portion along the direction which is one of the flow direction of the EGR gas and the direction orthogonal to the flow direction of the EGR gas and which intersect a longitudinal direction of the exothermic body.

Further, the method for making the water (water vapor) flow into the exothermic body containing portion toward a plurality of spots of the exothermic body is not limited to the method in which the communication passage diverges to a plurality of branches. For example, a method of expanding the passage sectional area of the communication passage at the upstream, when starting from the working gas tank 402, of the connection portion with the exothermic body containing portion 407 and connecting the communication passage to the exothermic body containing portion at the expansion portion can be used.

Third Embodiment

Figure 10:
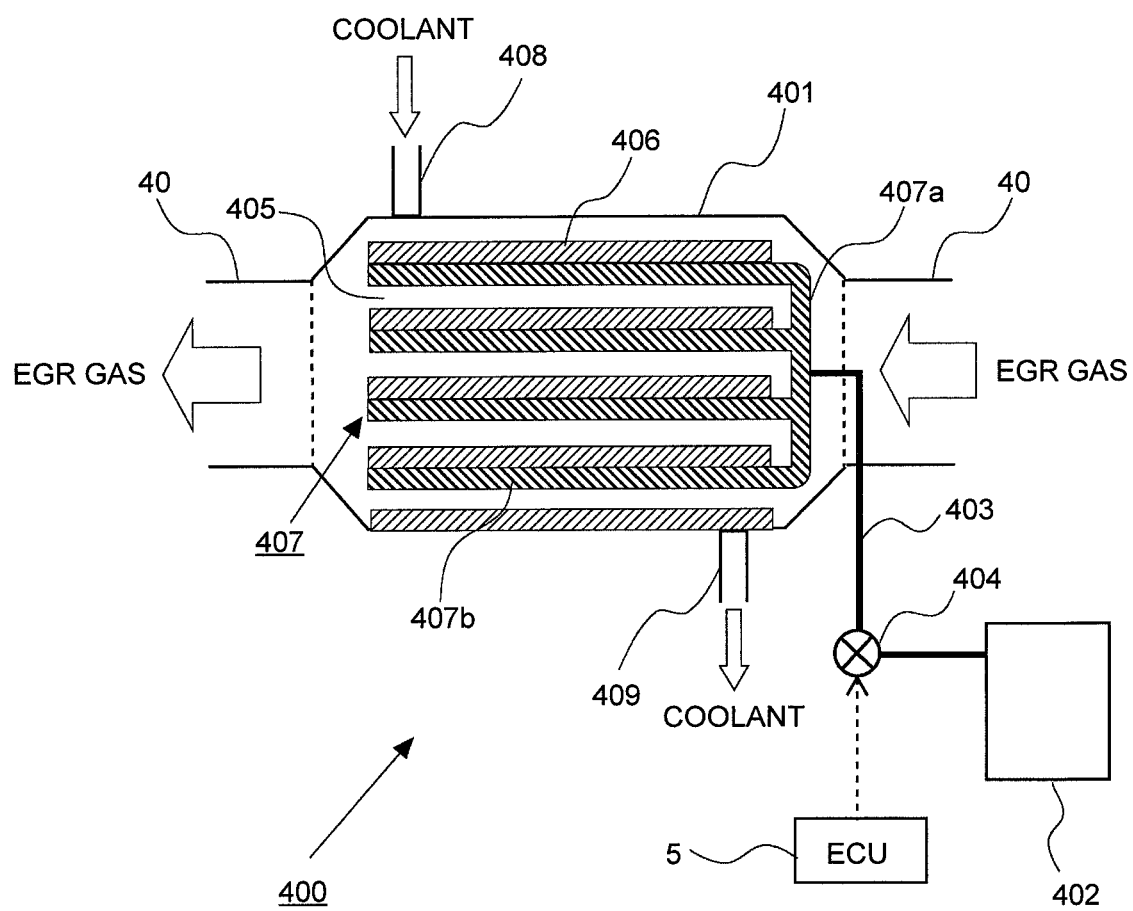
FIG. 10 is a diagram showing an internal configuration of an EGR cooler body in a third embodiment.

Next, a third embodiment of the disclosure will be described based on FIG. 10. Here, different configurations from the first and second embodiments will be described, and the description of the same configurations will be omitted. FIG. 10 is a diagram showing an internal structure of an EGR cooler body in the embodiment.

As shown in FIG. 10, in an EGR cooler body 401 according to the embodiment, the exothermic body containing portion 407 includes a convergence portion 407a that is disposed at an inlet portion of the EGR cooler body 401 and a plurality of divergence portions 407b that diverges from the convergence portion 407a. The convergence portion 407a is disposed such that the EGR gas flowing into the EGR cooler body 401 comes into contact with the convergence portion 407a before dispersing to a plurality of gas paths 405. Furthermore, the convergence portion 407a is disposed so as to be away from the partition wall forming the gas path 405 and the partition wall forming the refrigerant path 406. On the other hand, each divergence portion 407b is disposed so as to contact with the partition wall forming the gas path 405 and to contact with the partition wall forming the refrigerant path 406, similarly to the above-described first embodiment. For the exothermic body containing portion 407 configured in this way, the communication passage 403 is connected to the convergence portion 407a of the exothermic body containing portion 407. The other configuration is the same as that in the above-described first embodiment.

Since the EGR cooler body 401 is configured as described with FIG. 10, the wall surface of the gas path 405 is warmed efficiently by the heat generated from the exothermic body contained in the divergence portions 407b, at the time of the warm-up of the EGR cooler body 401, similarly to the above-described first embodiment. Moreover, in the valve-opened state of the EGR valve 41 at the time of the warm operation of the EGR cooler body 401, the high-temperature EGR gas before flowing into the gas path 405 (that is, before the heat is exchanged with the coolant in the refrigerant path 406 on the gas path 405) comes into contact with the convergence portion 407a, and thereby, the convergence portion 407a is rapidly warmed. Then, the heat of the convergence portion 407a is transmitted to the divergence portions 407b, and thereby, the temperature of the exothermic body contained in the divergence portions 407b is quickly raised. As a result, the working gas absorbed in the exothermic body at the time of the warm-up of the EGR cooler body 401 can be desorbed from the exothermic body and can be collected in the working gas tank 402, more quickly.

Other Embodiments

Each of the EGR coolers in the above-described first to third embodiments is configured such that the working gas is inevitably moved using the pressure difference between the exothermic body containing portion of the EGR cooler body and the working gas tank. However, the EGR cooler may be configured such that the working gas is forcibly moved between the exothermic body containing portion and the working gas tank. For example, in the EGR cooler, there may be provided a mechanism that shrinks the volume of the working gas tank when the working gas stored in the working gas tank is moved from the working gas tank to the exothermic body containing portion and that expands the volume of the working gas tank when the working gas desorbed from the exothermic body is moved from the exothermic body containing portion to the working gas tank. Further, in the EGR cooler, there may be provided a pump mechanism that sucks the working gas in the working gas tank and discharges the working gas toward the exothermic body containing portion when the working gas stored in the working gas tank is moved from the working gas tank to the exothermic body containing portion and that sucks the working gas in the exothermic body containing portion and discharges the working gas toward the working gas tank when the working gas desorbed from the exothermic body is moved from the exothermic body containing portion to the working gas tank. With these configurations, it is possible to move the working gas more surely, while reducing the influence of the temperature environment and the like of the exothermic body containing portion and the working gas tank.

What is claimed is:

1. An exhaust gas recirculation cooler which is disposed in a middle of an exhaust gas recirculation passage, the exhaust gas recirculation passage connecting an exhaust passage and an intake passage of an internal combustion engine, the exhaust gas recirculation cooler configured to perform heat exchange between an exhaust gas recirculation gas and a refrigerant, the exhaust gas recirculation gas being a gas which flows along the exhaust gas recirculation passage, the exhaust gas recirculation cooler comprising:
- a gas path which is a passage formed within the exhaust gas recirculation cooler, the gas path configured such that the exhaust gas recirculation gas flows along the gas path;
- a refrigerant path which is a passage along which the refrigerant circulates within the exhaust gas recirculation cooler, the refrigerant path configured to perform the heat exchange between the exhaust gas recirculation gas circulating along the gas path and the refrigerant;
- an exothermic body containing portion in which an exothermic body is contained within the exhaust gas recirculation cooler, the exothermic body generating heat by adsorbing a prescribed working gas, the exothermic body containing portion being configured such that at least a part of the exothermic body contacts with a wall surface of the gas path;
- a working gas tank in which the working gas is stored; and
- a gas moving apparatus being configured such that the working gas stored in the working gas tank moves from the working gas tank to the exothermic body containing portion.

2. The exhaust gas recirculation cooler according to claim 1, wherein:
- the working gas adsorbed in the exothermic body is desorbed when a temperature of the exothermic body is equal to or higher than a predetermined desorption temperature; and
- the gas moving apparatus is configured such that, after the amount of the working gas which is contained in the working gas stored in the working gas tank moves from the working gas tank to the exothermic body containing portion becomes equal to or larger than a predetermined amount, the working gas desorbed from the exothermic body moves from the exothermic body containing portion to the working gas tank when the temperature of the exothermic body is equal to or higher than the desorption temperature.

3. The exhaust gas recirculation cooler according to claim 2, wherein:
- the working gas tank is disposed outside the exhaust gas recirculation cooler; and
- the gas moving apparatus includes:
  - a communication passage which connects the exothermic body containing portion and the working gas tank;
  - a switching valve which is provided in a middle of the communication passage, the switching valve switching the communication passage between a conducted state and a blocked state; and
  - a control unit which controls the switching valve, wherein
- the control unit moves the working gas stored in the working gas tank from the working gas tank to the exothermic body containing portion by controlling the switching valve so as to conduct the communication passage, when a pressure of the working gas tank is higher than a pressure of the exothermic body containing portion.

4. The exhaust gas recirculation cooler according to claim 3, wherein a path for the working gas which includes the exothermic body containing portion, the working gas tank and the communication passage is filled with only an amount of the working gas, the amount being a containable amount of the working gas tank.

5. The exhaust gas recirculation cooler according to claim 3, wherein:
- after the control unit controls the switching valve so as to conduct the communication passage such that the working gas stored in the working gas tank moves from the working gas tank to the exothermic body containing portion, the control unit moves the working gas desorbed from the exothermic body, from the exothermic body containing portion to the working gas tank, by controlling the switching valve so as to continue to conduct the communication passage until a predetermined timing; and
- the predetermined timing is a timing after the temperature of the exothermic body rises to the desorption temperature.

6. The exhaust gas recirculation cooler according to claim 3, wherein the communication passage is connected to the exothermic body containing portion, such that the working gas flows along a direction intersecting a flow direction of the exhaust gas recirculation gas and flows toward a plurality of spots of the exothermic body in the exothermic body containing portion, when the working gas flows into the exothermic body containing portion.

7. The exhaust gas recirculation cooler according to claim 3, wherein the control unit moves the working gas stored in the working gas tank, from the working gas tank to the exothermic body containing portion, by controlling the switching valve so as to conduct the communication passage, when a temperature of the internal combustion engine at a start of the internal combustion engine is lower than a predetermined threshold.

8. The exhaust gas recirculation cooler according to claim 7, further comprising a circulation control unit which allows the exhaust gas recirculation gas to flow along the gas path when a predetermined circulation condition is satisfied, wherein the circulation condition includes a condition in which a time elapsing after the control unit controls the switching valve so as to conduct the communication passage when the temperature of the internal combustion engine at the start of the internal combustion engine is lower than the threshold is equal to or longer than a predetermined temperature rise time.

9. The exhaust gas recirculation cooler according to claim 1, wherein at least a part of the exothermic body containing portion is disposed so as to be adjacent to the refrigerant path.

10. The exhaust gas recirculation cooler according to claim 1, wherein:
- the working gas is a gas which has a molecular size equivalent to or smaller than a molecular size of water or ammonia; and
- the exothermic body is formed of a porous material which has a plurality of pores having a larger pore size than the molecular size of the working gas.

* * * * *